(12) United States Patent
Iannacchione et al.

(10) Patent No.: US 9,194,609 B2
(45) Date of Patent: Nov. 24, 2015

(54) SHOP-ASSEMBLED SOLAR RECEIVER HEAT EXCHANGER

(75) Inventors: Steven P. Iannacchione, Canal Fulton, OH (US); Dennis R. Shiffer, Lawrence Township, Stark County, OH (US); David T. Wasyluk, Mogadore, OH (US); Jason M. Marshall, Wadsworth, OH (US); David L. Kraft, Massillon, OH (US); George Grant, Akron, OH (US); Kiplin C. Alexander, Wadsworth, OH (US); Rickey A. Wilson, Marshallville, OH (US); Justin A. Persinger, Wooster, OH (US); Adam N. DePizzo, Green Township, Summit County, OH (US); Melvin J. Albrecht, Homeworth, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 1706 days.

(21) Appl. No.: 12/605,241

(22) Filed: Oct. 23, 2009

(65) Prior Publication Data

US 2010/0101564 A1   Apr. 29, 2010

Related U.S. Application Data

(60) Provisional application No. 61/197,169, filed on Oct. 24, 2008.

(51) Int. Cl.
*F24J 2/24* (2006.01)
*F03G 6/00* (2006.01)
(Continued)

(52) U.S. Cl.
CPC .............. *F24J 2/245* (2013.01); *F22B 1/006* (2013.01); *F22B 37/201* (2013.01); *F22B 37/208* (2013.01); *F24J 2/07* (2013.01); *Y02E 10/41* (2013.01); *Y02E 10/44* (2013.01)

(58) Field of Classification Search
CPC ...... F22B 37/20; F22B 37/201; F22B 37/202; F22B 37/203; F22B 37/204; F22B 37/205; F22B 37/5206; F22B 37/207; F22B 37/208; F22B 29/062; F22B 1/006
USPC .......... 126/569, 235.11, 235.14, 460, 235.12, 126/626, 627, 635, 645, 651, 655, 658, 659, 126/661, 663, 680, 634, 689, 573, 704; 165/173, 175, 272, 104.22, 48.2, 81, 165/82; 410/49, 44; 122/493, 235.12, 122/235.23; 248/49, 73, 72
See application file for complete search history.

(56) References Cited

U.S. PATENT DOCUMENTS 2,352,717 A   7/1944   Karlsson
2,675,895 A   4/1954   Loewenstein
(Continued)

FOREIGN PATENT DOCUMENTS

CN   201066242 Y   5/2008
EP   0025975 A2    1/1981
(Continued)

OTHER PUBLICATIONS

Notice of the First Office Action from the State Intellectual Property Office of the People's Republic of China dated Jul. 3, 2012.
(Continued)

*Primary Examiner* — Avinash Savani
*Assistant Examiner* — Vivek Shirsat
(74) *Attorney, Agent, or Firm* — Eric Marich

(57) ABSTRACT

A shop-assembled solar receiver heat exchanger having an arrangement of heat transfer surfaces and a vertical steam/water separator structurally and fluidically interconnected thereto. A vertical support structure is provided to support the vertical separator and the heat transfer surfaces. The vertical support structure is bottom supported, while the vertical steam/water separator and heat exchanger heat transfer surfaces are top supported from the vertical support structure. The vertical support structure provides structural support and rigidity for the heat exchanger and a means by which the heat exchanger can be picked up and lifted for placement at a desired location. A fabrication/transport/lifting fixture is provided which facilitates fabrication, assembly, transportation and erection of the heat exchanger from the shop to the field.

The fixture supports two trunnion shafts attached to the support structure of the receiver. Lifting lugs would be located on the top end of the support structure. Upon arrival at the job site in the field, a crane lifts the heat exchanger receiver to vertical, rotating about the trunnion shafts on the fixture, and then lifts the heat exchanger receiver for placement at a desired location.

23 Claims, 16 Drawing Sheets

(51) Int. Cl.
*F22B 1/00* (2006.01)
*F22B 37/20* (2006.01)
*F24J 2/07* (2006.01)

(56) References Cited

U.S. PATENT DOCUMENTS

| | | | |
|---|---|---|---|
| 3,030,937 | A | 4/1962 | Ernest |
| 3,708,024 | A | 1/1973 | Back |
| 4,089,325 | A | 5/1978 | Brola |
| 4,245,618 | A | 1/1981 | Wiener |
| 4,263,893 | A | 4/1981 | Pavlak et al. |
| 4,290,389 | A | 9/1981 | Palchik |
| 4,485,803 | A * | 12/1984 | Wiener ............ 126/591 |
| 4,512,336 | A * | 4/1985 | Wiener ............ 126/651 |
| 4,524,727 | A | 6/1985 | Ammann |
| 4,539,939 | A | 9/1985 | Johnson |
| 4,576,120 | A | 3/1986 | Ammann |
| 4,621,681 | A | 11/1986 | Grover |
| 4,688,628 | A | 8/1987 | Moldenhauer |
| 4,895,204 | A | 1/1990 | Johnson et al. |
| 4,940,025 | A | 7/1990 | Ott et al. |
| 5,056,468 | A | 10/1991 | Wittchow et al. |
| 5,329,995 | A * | 7/1994 | Dey et al. ............ 165/153 |
| 5,339,891 | A | 8/1994 | Kidaloski et al. |
| 5,482,233 | A * | 1/1996 | Marko et al. ............ 248/73 |
| 5,626,103 | A | 5/1997 | Haws et al. |
| 5,685,151 | A | 11/1997 | Ross |
| 5,944,089 | A | 8/1999 | Roland |
| 6,092,591 | A | 7/2000 | McDonald et al. |
| 6,273,182 | B1 | 8/2001 | Pautler et al. |
| 6,336,429 | B1 * | 1/2002 | Wiener et al. ............ 122/488 |
| 7,011,086 | B2 * | 3/2006 | Litwin ............ 126/651 |
| 7,520,249 | B2 | 4/2009 | Morin et al. |
| 2001/0023665 | A1 | 9/2001 | Heidrich |
| 2003/0010478 | A1 | 1/2003 | Colic et al. |
| 2004/0025466 | A1 | 2/2004 | Hink et al. |
| 2005/0063795 | A1 * | 3/2005 | Jagos et al. ............ 410/49 |
| 2005/0252161 | A1 | 11/2005 | Hovey, Jr. |
| 2006/0175040 | A1 | 8/2006 | Waseda et al. |
| 2006/0243223 | A1 * | 11/2006 | Retting et al. ............ 122/4 R |
| 2007/0074860 | A1 | 4/2007 | Shinhama |
| 2007/0278169 | A1 | 12/2007 | Grainger |
| 2007/0283906 | A1 | 12/2007 | Albrecht |
| 2009/0178779 | A1 | 7/2009 | White et al. |
| 2010/0101564 | A1 | 4/2010 | Iannacchione et al. |

FOREIGN PATENT DOCUMENTS

| | | |
|---|---|---|
| GB | 423711 | 2/1935 |
| GB | 474650 | 11/1937 |

OTHER PUBLICATIONS

Office Action (Rejection) from the Egyptian Patent Office received May 7, 2012.

Examination Report from New Zealand Intellectual Property Office dated Apr. 27, 2012.

Technical Paper, Water/steam receivers for solar repowering, by M. Wiener, BR-1178, Babcock & Wilcox, dated Oct. 13-14, 1980.

Technical Paper, Solar Power Tower (SPT) Design Innovations to Improve Reliability and Performance—Reducing Technical Risk and Cost, by A. B. Zovoico, W. R. Gould, B. D. Kelly, and I. G. Pastoril, Proceedings Solar Forum 2001, dated Apr. 21-25, 2001.

Solar Thermal Central Receiver Technology, An Alternative for Process Heat and Electric Power Generation, E105-3045, Babcock & Wilcox, dated Oct. 1981.

Technical Paper, Summary of Final Report on Solar Advanced Steam/Water Receiver, by O. W. Durrant and M. Wiener, BR-1163, Babcock & Wilcox, dated Mar. 19-20, 1980.

Technical Paper, Conceptual Design of a Solar Advanced Water/Steam Receiver, by O. W. Durrant, BR-1139, Babcock & Wilcox, Sep. 11-12, 1979.

* cited by examiner

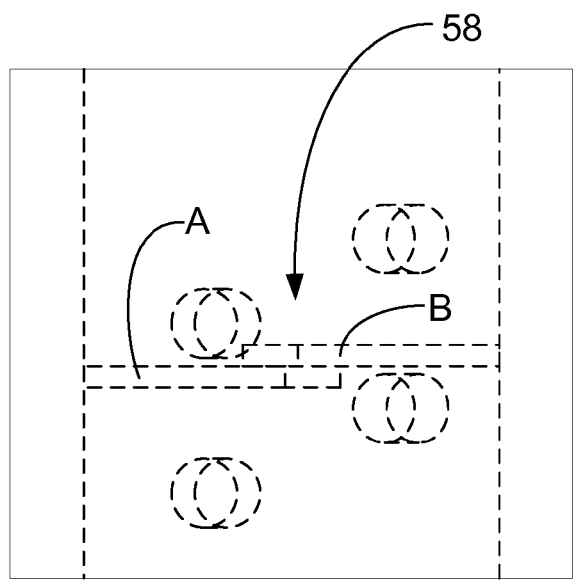
FIG. 15
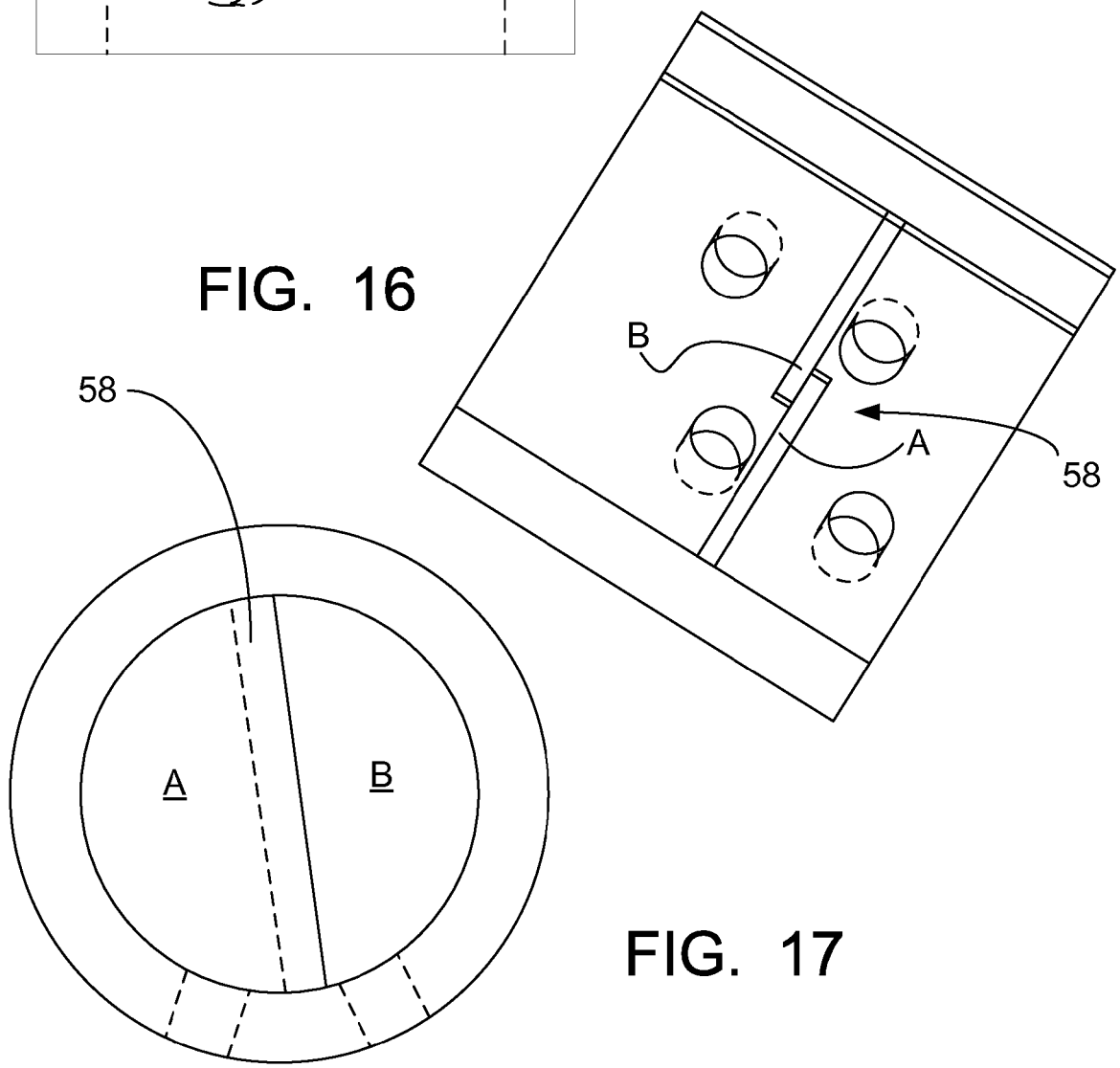
FIG. 16
FIG. 17

SHOP-ASSEMBLED SOLAR RECEIVER HEAT EXCHANGER

CROSS-REFERENCE TO RELATED APPLICATION

The present invention claims priority from U.S. Provisional Application for Patent Ser. No. 61/197,169, filed Oct. 24, 2008, the text of which is hereby incorporated by reference as though fully set forth herein.

FIELD AND BACKGROUND OF THE INVENTION

The present invention relates, in general, to the field of power generation and industrial boiler design, including boilers, steam generators and heat exchangers used in the production of steam, such as those used to generate electricity or those used for industrial steam applications and, more particularly, to a shop-assembled solar receiver heat exchanger having an integral support structure.

A solar receiver is a primary component of a solar energy generation system whereby sunlight is used as a heat source for the production of high quality steam that is used to turn a turbine generator, and ultimately generate electricity. The receiver is permanently positioned on top of an elevated support tower that is strategically positioned in a field of heliostats, or mirrors, that collect rays of sunlight and reflect those rays back to target wall(s) in the receiver. An efficient, compact solar receiver for such systems which is simple in design, rugged in construction and economical to manufacture would be welcomed by the industry.

SUMMARY OF THE INVENTION

One aspect of the present invention is drawn to a shop-assembled solar receiver heat exchanger for transferring heat energy from the sun into a working fluid, such as water. The heat exchanger is used to transform at least a portion of the water from the liquid phase into saturated or superheated steam.

In particular, one aspect of the present invention is drawn to a shop-assembled solar receiver heat exchanger comprising: an arrangement of heat transfer surfaces, a vertical steam/water separator structurally and fluidically interconnected thereto; and a vertical support structure top supporting the vertical steam/water separator and the heat transfer surfaces.

The shop-assembled solar receiver heat exchanger is placed on top of a tower and uses the energy of the sun to heat the working fluid. A heliostat field of mirrors located on the ground automatically tracks the sun, and reflects and concentrates light energy to the shop-assembled solar receiver heat exchanger. The incident solar insolation heats the working fluid, typically water, to produce saturated or superheated steam which can be provided to a steam turbine to generate electricity.

A vertical steam/water separating device, disclosed in the aforementioned U.S. Pat. No. 6,336,429 to Wiener et al., is used to separate the steam from the steam-water mixture. The vertical steam/water separator is structurally and fluidically interconnected with the heating surfaces of the shop-assembled solar receiver heat exchanger as part of a shop-assembled design as described herein.

The vertical support structure is bottom supported from a base which is connected to the tower. Buckstays are provided on the vertical support structure to provide lateral support for the arrangement of heat transfer surfaces, which advantageously comprise loose tangent tube panels, while allowing for unrestrained thermal expansion of the tube panels in both the horizontal and vertical directions, thereby eliminating additional tube stresses.

The vertical support structure and the base, buckstays and other structural members not only provide structural support and rigidity for the shop-assembled solar receiver heat exchanger, but also a means by which the heat exchanger can be picked up and lifted for placement at a desired location. The structure permits the entire assembly of the heat exchanger, vertical steam/water separator and tangent tube panels of heating surface to be shop-assembled, transported, and then lifted and set upon a tower as a unit during installation. The vertical support structure remains with the solar receiver heat exchanger, thereby facilitating (if necessary) the removal of the solar receiver heat exchanger from the tower should it become desirable to do so.

The shop-assembled solar receiver heat exchanger according to the present invention is advantageously comprised of an arrangement of heat transfer surfaces and fluid conveying conduits arranged in a particular fashion to transfer a desired amount of heat energy into the water. The heat transfer surfaces are advantageously made of tubes arranged into tangent tube panels, and are provided with inlet and outlet headers as required. As is known to those skilled in the art, heat transfer surfaces which convey steam-water mixtures are commonly referred to as evaporative or boiler surfaces; heat transfer surfaces which convey steam therethrough are commonly referred to as superheating (or reheating, depending upon the associated steam turbine configuration) surfaces. Regardless of the type of heating surface, the sizes of tubes, their material, diameter, wall thickness, number and arrangement are based upon temperature and pressure for service, according to applicable boiler design codes, such as the American Society of Mechanical Engineers (ASME) Boiler and Pressure Vessel Code, Section I, or equivalent other codes as required by law. Required heat transfer characteristics, pressure drop, circulation ratios, spot absorption rates, mass flow rates of the working fluid within the tubes, etc. are also important parameters which must be considered. Depending upon the geographic location where the heat exchanger is to be installed, applicable seismic loads and design codes are also considered.

In another aspect of the invention, shop-assembly, transport and field erection are facilitated by a fabrication/transport/lifting fixture which facilitates fabrication, assembly, transportation and erection of the heat exchanger from manufacture in the shop to installation in the field. The fixture supports two trunnion shafts attached to the vertical support structure of the solar receiver. Lifting lugs are located on the top end of the support structure. Upon arrival at the installation site in the field, a crane lifts the heat exchanger receiver to vertical, pivoting on the trunnion shafts, and then lifts the solar receiver heat exchanger for placement at a desired location.

More particularly, another aspect of the present invention is drawn to a fixture for facilitating fabrication, assembly, transportation and erection of a shop-assembled solar receiver heat exchanger, comprising: a base; and stanchions provided at one end of the base for engaging trunnion shafts on the shop-assembled solar receiver heat exchanger, the stanchions permitting rotation of the shop-assembled solar receiver heat exchanger about the trunnion shafts on the stanchions from a shipping position to a substantially vertical position during a portion of the field erection process of the shop-assembled solar receiver heat exchanger.

The various features of novelty which characterize the invention are pointed out with particularity in the claims annexed to and forming part of this disclosure. These and other features of the present invention will be better understood and its advantages will be more readily appreciated from the following description, especially when read with reference to the accompanying sheets of drawings. Thus, for a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

FIGS. 15, 16 and 17 illustrate top, end and cut-away views, respectively, of a split diaphragm plate, according to the present invention, used in the superheater inlet and outlet headers to provide multiple steam paths in the superheat panels when tangent tubes are employed;

DETAILED DESCRIPTION OF THE INVENTION

Figure 1:
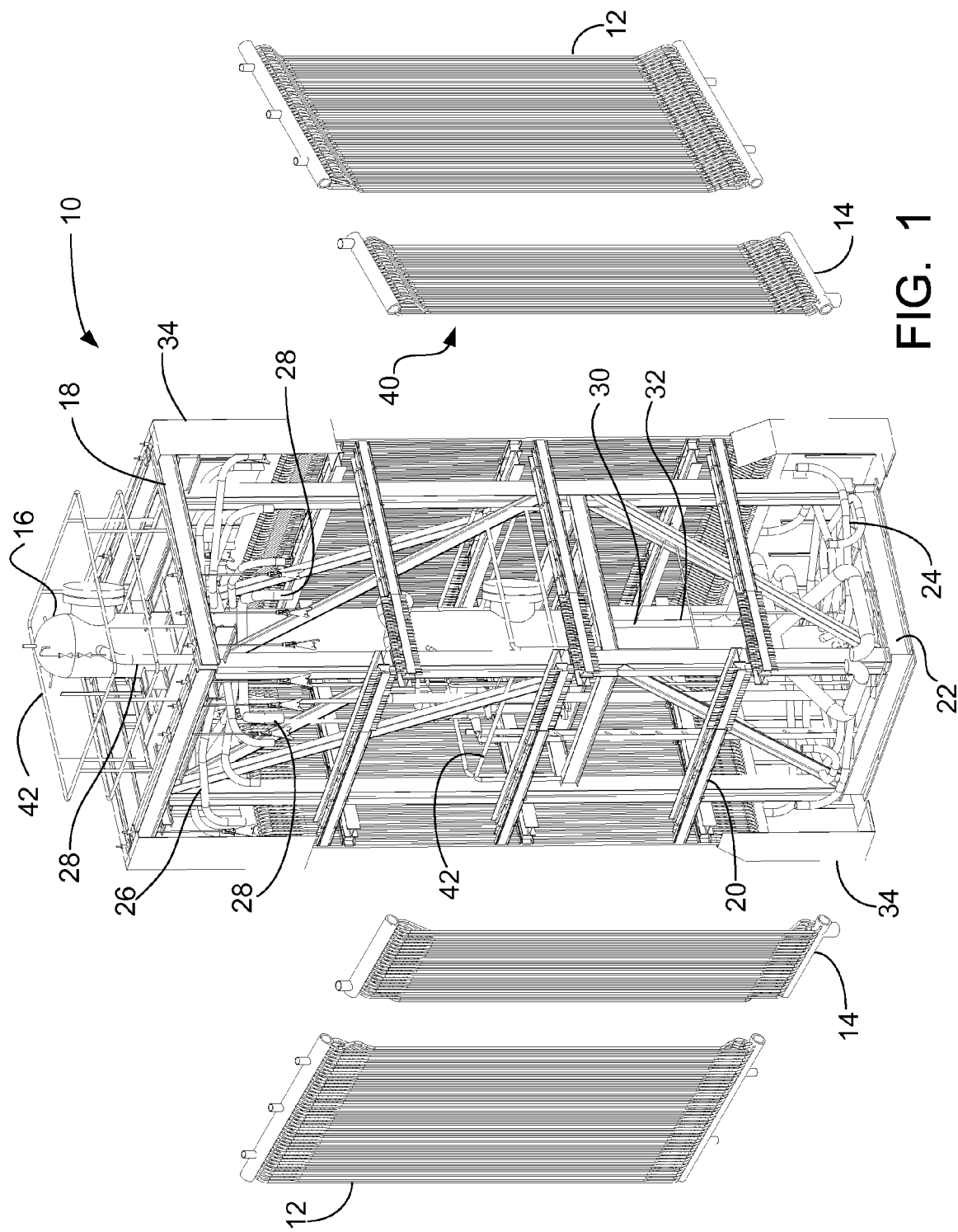
FIG. 1 is an exploded perspective isometric view of the shop-assembled solar receiver heat exchanger according to the present invention, illustrating the arrangement of heat transfer surfaces, a vertical steam/water separator structurally and fluidically interconnected thereto; and a vertical support structure provided to top support the vertical separator and the heat transfer surfaces.

Reference will hereinafter be made to the accompanying sheets of drawings wherein like reference numerals designate the same or functionally similar elements throughout the several drawings.

The present invention employs a vertical steam/water separating device according to the teachings of U.S. Pat. No. 6,336,429 to Wiener et al. to separate the steam from the steam-water mixture produced by the shop-assembled solar receiver heat exchanger of the present invention. The text of the aforementioned U.S. Pat. No. 6,336,429 to Wiener et al., is hereby incorporated by reference as though fully set forth herein. The vertical steam/water separator is structurally and fluidically interconnected with the heating surfaces of the shop-assembled solar receiver heat exchanger as part of a shop-assembled design as described herein.

To the extent that explanations of certain terminology or principles of the heat exchanger, boiler and/or steam generator arts may be necessary to understand the present invention, the reader is referred to *Steam/its generation and use,* 40th Edition, Stultz and Kitto, Eds., Copyright ©1992, The Babcock & Wilcox Company, and to *Steam/its generation and use,* 41st Edition, Kitto and Stultz, Eds., Copyright ©2005, The Babcock & Wilcox Company, the texts of which are hereby incorporated by reference as though fully set forth herein.

Referring to FIGS. 1 through 11, there is shown a shop-assembled solar receiver heat exchanger 10 according to the present invention, and which is comprised of the following major components:

Evaporator or boiler tube panels 12;
Primary superheater (PSH) and secondary superheater (SSH) tube panels 14;
A vertical steam/water separator 16;
Vertical, internal support structure 18, buckstays 20 and tower connection 22;
Supplies 24, risers 26 and saturated connection piping 28;
Spray water attemperator 30 and piping 32;
Header heat shields 34;
Light barrier 36 and insulation 38;
Instrumentation 40; and
Platforms 42 and access ladders.

More particularly, and referring generally to FIGS. 1 through 11 in order, the shop-assembled solar receiver heat exchanger 10 has an arrangement of evaporative 12 and superheater 14 heat transfer surfaces, a vertical steam/water separator 16 structurally and fluidically interconnected thereto; and a vertical, internal support structure 18 provided to top support the vertical steam/water separator 16 and the heat transfer surfaces 12, 14. The vertical support structure 18 is interposed between the vertical steam/water separator 16 and the arrangement of heat transfer surfaces, 12, 14. The shop-assembled solar receiver heat exchanger 10 is fully shop assembled except for the header heat shields 34, safety valves, vents, silencers and other delicate instruments (not shown). The shop-assembled solar receiver heat exchanger 10 is fully drainable.

Each side of the shop-assembled solar receiver heat exchanger 10 comprises one evaporator tube panel 12 and one superheater panel 14. Two primary superheater (PSH) panels 14 form one corner of the receiver 10 and two secondary superheater (SSH) panels 14 form an opposite corner (not shown). The evaporator 12 and superheater 14 panels are constructed of closely spaced tangent loose tubes (no membrane) with tube bends near the headers for additional flexibility. The tubes are small diameter thin wall tubes to minimize hot to cold face tube temperature differentials. The tube attachments allow for unrestrained thermal expansion of the tube panels in both the horizontal and vertical directions, thereby eliminating additional tube stresses. These design features maximize flexibility and minimize thermal stresses and the potential for tube bowing. While the above-described arrangement of evaporator tube panels 12 and superheater tube panels 14 is one preferred embodiment, other arrangements are within the scope of the present invention. For example, the evaporator 12 and superheater 14 panels may not be placed on every side, or the superheater panels 14 may not meet at a corner, or there may even be different configurations of plural evaporative 12 and superheater panels 14 provided on a given side.

The solar receiver heat exchanger 10 is top supported from the internal vertical support structure 18. The vertical support structure 18 is bolted to a tower flange (not shown) via a transition section 22 integral to the base structure of the solar receiver 10. There are three elevations of buckstays 20 to transmit wind and seismic loads from the panels 12, 14 into the support structure 18. The beams of the buckstays 20 are fixed to the columns of the vertical, internal support structure 18.

The receiver 10 is designed for natural circulation and does not require a circulating pump. Feedwater enters the vertical separator 16 near mid height of the receiver 10. The subcooled water flows down through the downcomer pipe 17 at the bottom of the vertical separator. Supply pipes 24 carry the water to the lower headers of the evaporator panels 12. The heat from the mirror field is absorbed by the water flowing upward though the tubes in the panels 12 which is lower in density than the water leaving the vertical separator 16 resulting in a natural pumping action. The water-steam mixture exits the headers at the top of the evaporator panels 12. Risers 26 carry the water-steam mixture to the vertical separator 16. The inlet nozzles of the riser connections 27 on the vertical separator 16 are arranged tangentially and slope downward to impart a downward spin to initiate moisture removal. Wet steam flows upward through a perforated plate, scrubber and dry pan for final moisture removal. The water removed flows down and mixes with the water inventory in the vertical separator 16 for recirculation. While the supply pipes 24 and the risers 26 are illustrated in the FIGS. as being relatively straight fluid paths, it will be appreciated by those skilled in the art that their actual design in terms of arrangement and length will be determined by the degree of flexibility required to accommodate expected motions caused by thermal expansion and contraction during operation of the solar receiver heat exchanger. It is thus likely that additional bends or length may be necessary to provide such flexibility.

Dry saturated steam leaves the top of the vertical separator 16 and flows through the saturated connections 28 to the PSH 14 inlet headers located at the top of the panels 14. Both PSH panels 14 have one or more (in one embodiment, five) steam passes with plural (in one embodiment, nine (9)) tubes per pass with diaphragm headers 58 of a special design due to the fact that the panels are comprised of closely spaced tangent tubes (see FIGS. 15-17). Steam flows through both PSH panels 14 in parallel, starting at the ends adjacent the evaporator panels 12 and flows toward the center. This arrangement puts the coldest steam next to the evaporator panels 12 to protect the PSH 14 from spillage during startup. Steam then exits the PSH headers at the bottom, mixes and flows upward though the attemperator 30 and associated piping 32 (feedwater is used for attemperation), then splits and enters the SSH 14 headers at the top. The SSH panels 14 are arranged the same as the PSH panels 14, but are located on an opposite corner of the solar receiver 10. Steam leaves the receiver 10 via a main steam pipe (not shown) located at the bottom of the receiver 10.

The upper and lower headers and tube bends on the evaporator 12 and PSH, SSH panels 14 are protected from spillage and stray light energy by heat shields 34 that extend around the perimeter of the receiver 10 as shown. Advantageously, the heat shields 34 comprise stiffened steel plate that is supported by the receiver structure 18. The exposed side is painted white to reduce operating temperatures. The back side is not insulated to reduce operating temperatures. There is also gap between the heat shield 34 and tubes forming the panels 12, 14 to allow natural air flow for additional cooling.

The back of the panels 12, 14 will require a light barrier 36 to protect the insulation 38 and structure from rain and heat exposure that may get through gaps between the loose tangent tubes. Advantageously, the barrier 36 may comprise an array of metal sheets supported by the tube attachment structure. The barrier 36 may be painted white on the tube side to maximize reflectance and reduce operating temperatures. The barrier 36 will also support the panel insulation 38 and associated lagging.

The heat exchanger 10 will include instrumentation 40 to measure tube hot face and fluid temperatures, heat flux on panels and possibly strain, deflection and thermal expansion of various components of the receiver, if desired. In all the FIGURES, the location of this instrumentation 40 is merely schematically indicated, rather than specifically drawn and called out.

Two platforms 42 are provided to access the upper and lower manways or access doors on the vertical steam/water separator 16, which are accessible by ladders.

Although the heat exchanger receiver 10 is fully drainable, daily draining may not be economical or desired, hence heat tracing, insulating cover or some other means may be required for freeze protection, particularly for the tube panels 12 which are exposed.

The vertical steam/water separator 16 is of the type disclosed in the aforementioned U.S. Pat. No. 6,336,429 to Wiener et al., and operates in known fashion to separate the steam from the steam-water mixture. The vertical steam/water separator 16 of this type is particularly suited to handle large transient swings in heat input to the heat exchanger 10 which may, in turn, cause large variations in water levels within the steam/water separator 16. The water separated from the steam-water mixture is conveyed to a lower portion of the separator 16, mixed with make-up feedwater, and conveyed to the evaporative surface 12 to start the process over again.

The vertical steam/water separator 16 was chosen over a traditional horizontal steam drum for the following reasons: 1) it fits well into the receiver interior; 2) it eliminates the possibility of drum humping; 3) steam separating surface area could be achieved with the vertical separator; and 4) if desired, the vertical separator can be used to support the heat exchanger heating surface tube panels and can alternatively be bottom supported.

Figure 11:
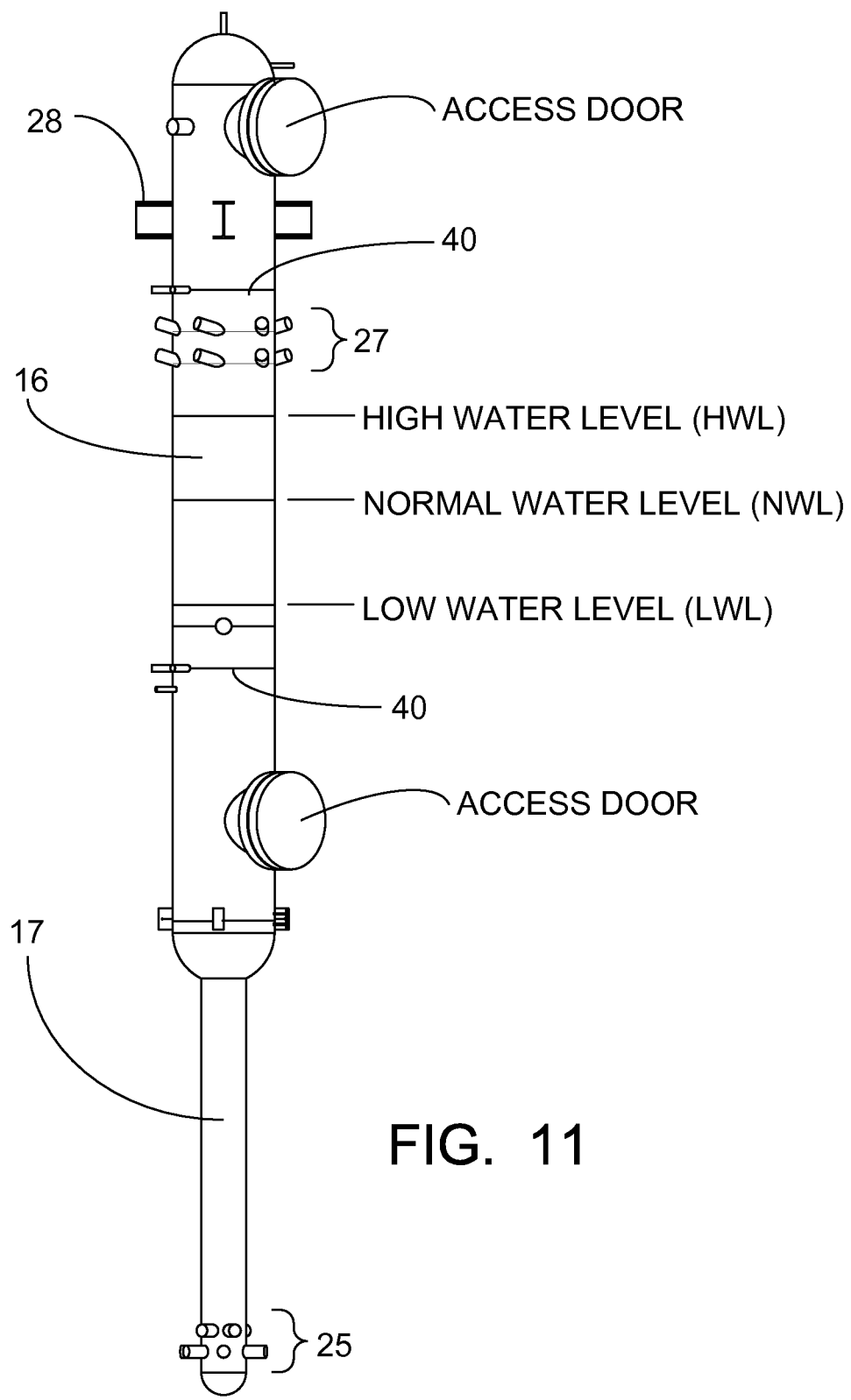
FIG. 11 is another view of the vertical steam/water separator according to the present invention, illustrating various connections thereto as well as low, normal and high water levels for the vertical steam/water separator.

There are other advantages to the use of the vertical steam/water separator 16 in the solar receiver heat exchanger 10 according to the present invention, instead of a traditional horizontal steam drum, particularly during shut down conditions. These advantages arise from a combination of the structure of the separator 16 and connections thereto, as well as the physical relationship of the locations of these connections and the elevations of the upper headers of the evaporator panels 12. Referring to FIG. 11, the relationship among the elevation of the upper evaporator panel 12 headers relative to the elevation of the normal water level (NWL), high water level (HWL) and riser connections or penetrations 27 in the vertical separator 16 are specifically set to conserve the vertical separator 16's temperature and pressure; primarily this feature is utilized during overnight shutdowns. The normal operation HWL is set at an elevation matching the elevation of the upper evaporator panel 12 headers, and normal operation NWL is somewhere below the HWL (FIG. 11). The riser penetrations 27 in the vertical separator 16 are above the normal operation HWL and the upper evaporator panel 12 headers. After being shut down, the water in the evaporator panels 12 cools and is more dense than the water in the vertical separator 16, which is still warm and less dense. Because of this density difference the water in the evaporator panels 12 wants to flow backwards: down the evaporator panels 12, through the supplies 24 and supply connections 25 and up the downcomer pipe 17 into the vertical separator 16; if this occurred the cool water from the evaporator panels 12 would quickly cool the vertical separator 16. However, because the riser penetrations 27 in the vertical separator 16 are above the normal operation HWL, the warmer water already in the vertical separator 16 is not connected to the risers 26 and cannot flow into the risers 26 and upper evaporator panel 12 headers, and thus the backwards circulation cannot occur. This forces the cool water in the evaporator panels 12 to remain in the evaporator panels 12 allowing the warm water to remain in the vertical separator 16 which helps to conserve vertical separator 16 temperature and pressure overnight. As a result, at the following morning, the vertical separator 16 is at an elevated temperature and pressure which allows the solar receiver heat exchanger 10 to startup faster than if the vertical separator 16 were to cool completely to ambient temperature. It is important to note that this particular arrangement or setting of the HWL, NWL and LWL for the vertical separator 16 thus still allows the circulation system to function in an acceptable manner when the evaporator panels 12 are receiving heat; the circulation system has been optimized to operate normally during regular steam generation conditions and yet provides the above-described special features to minimize the cool down of the circulation system when the solar receiver heat exchanger 10 is not in operation. This concept is much easier to do with the vertical separator 16 according to the present invention in comparison to a boiler employing a traditional horizontal steam drum.

The solar receiver heat exchanger 10 must be capable of fast startups and load raising following cloud passes to maximize available heat usage and operation at full load and minimize off pointing of mirrors. A traditional steam drum is susceptible to drum humping (described below) if the load is increased or decreased too fast. If a cloud passes and decreases heat to the receiver with the turbine throttle valve wide open, drum pressure will drop due to the drop in steam production. This will superheat the steam in the drum causing the top half of the drum to be at a higher metal temperature than the bottom half which in turn causes the drum to distort or hump upward. The opposite happens on a rapid load increase because the steam condenses and cools the top half of the drum. Over time, this could lead to fatigue damage to the steam drum.

The inside diameter of the vertical steam/water separator vessel 16 is selected to provide enough surface area for the steam separating equipment and enough water inventory to allow the boiler to operate at peak steam flow for several minutes (about 1-½ minutes) in the event of a feedwater trip, even if the water level within the vessel was at the low water level (LWL) line when the trip occurs.

The steam separating equipment within the vessel 16 comprises a perforated plate, scrubber and dry pan which are located near the top of the vertical separator 16 as shown. The purpose of these components is to remove any additional moisture from the steam before it exits the vessel 16. This, in turn, reduces the possibility of solids carryover into the superheater 14 which could plate out inside the tubes and cause hot spots.

The feedwater connection to the vertical steam/water separator has a thermal sleeve. This nozzle is angled down so that feedwater does not impinge and thermally shock the vessel 16 if the water is below the low water level.

The upper and lower manways or access doors (see FIGS. 1, 4, and 11) provide access to service the steam separating equipment and vortex inhibitor, respectively. The vessel 16 is insulated and lagged to reduce heat loss.

The shop-assembled solar receiver heat exchanger 10 is designed to operate without a circulation pump and with natural circulation characteristics. This means that circuits receiving more heat input have more steam/water flow and circuits receiving less heat input will have less flow. Although not preferred, if desired in order to facilitate the circulation of the water and water-steam mixture throughout the heat exchanger 10, one or more circulation pumps may advantageously be provided at the lower portion of the separator 16 in the downcomer pipe 17 for pumping the water back to the evaporative surface to provide for assisted circulation or pumped circulation operation.

The solar receiver heat exchanger panels 12, 14 are designed for high reliability to achieve a long life under highly cyclic operating conditions and be capable of withstanding daily startups, shutdowns and cloud transients without suffering low cycle fatigue damage. The evaporative 12 and superheater 14 heat transfer surfaces are comprised of loose tangent tube panels; that is, the tubes are closely spaced to one another and are not welded together. During operation, each tube in the panels wants to thermally expand to a different length than other tubes due to temperature differences between the tubes, but the lower headers will approximately move down based on the average tube temperature and remain horizontal and, because it is much stiffer than the tubes, it will not bend. This will impart stresses in the tubes, particularly in the superheater, because each pass operates at a different average temperature. The tube bends at the inlet and outlet headers therefore provide a spring, so to speak, to reduce tube stresses near the header connections and reduce the potential for tube bowing. Top supporting the panels provides free downward thermal expansion. The tubes are small diameter with thin wall to minimize hot to cold face temperature differentials, thermal stresses and the potential for bowing; in one embodiment, the evaporator 12 and superheater 14 panels are made of $^{31}\!/_{32}$" OD×0.095" MW tubes of SA210A1 and SA213T22 material, respectively. Other tube materials and thicknesses may be employed, depending upon temperature, pressure and other considerations.

The evaporative heating surface 12 panels are provided with lower inlet headers and upper outlet headers. This facilitates the natural circulation design of the solar receiver heat exchanger 10. The steam-water mixture generated in tubes forming the evaporative heating surface 12 panels is collected in the upper outlet headers which also serve as a mix point to even out temperature imbalances which may exist in the steam-water mixture. Stubs on the outlet headers are interconnected via risers 26 to stubs or riser connections 27 on the upper portion of the vertical steam/water separator 16. The vertical steam/water separator 16 operates in known fashion (see U.S. Pat. No. 6,336,429 to Wiener et al.), separating the steam from the steam-water mixture.

If the heat exchanger 10 is designed simply for saturated steam production, without superheat, all the panels would be evaporative surface 12, and saturated steam outlet connections 28 from the top portion of the separator 16 would convey the steam to its downstream location and use.

Depending upon the initial steam temperature and pressure, and the desired outlet superheated steam temperature, the panels comprising the superheater surfaces 14 may be multiple-pass superheater in order to provide adequate mass flow rates within the superheater surface tubes, and such concepts are within the scope of the present invention. Such multiple pass designs take into account the temperatures of not only the tubes in the superheater 14, but also the temperature of the tubes in an adjacent structure or evaporator panel 12, in order to address differential thermal expansion concerns. Further, throughout the present specification, the reference to superheater 14 may refer, depending upon the context, to either or both of primary superheater (upstream of a stage of spray attemperation for steam temperature control) and secondary superheater (downstream of a stage of spray attemperation for steam temperature control).

Figure 12:
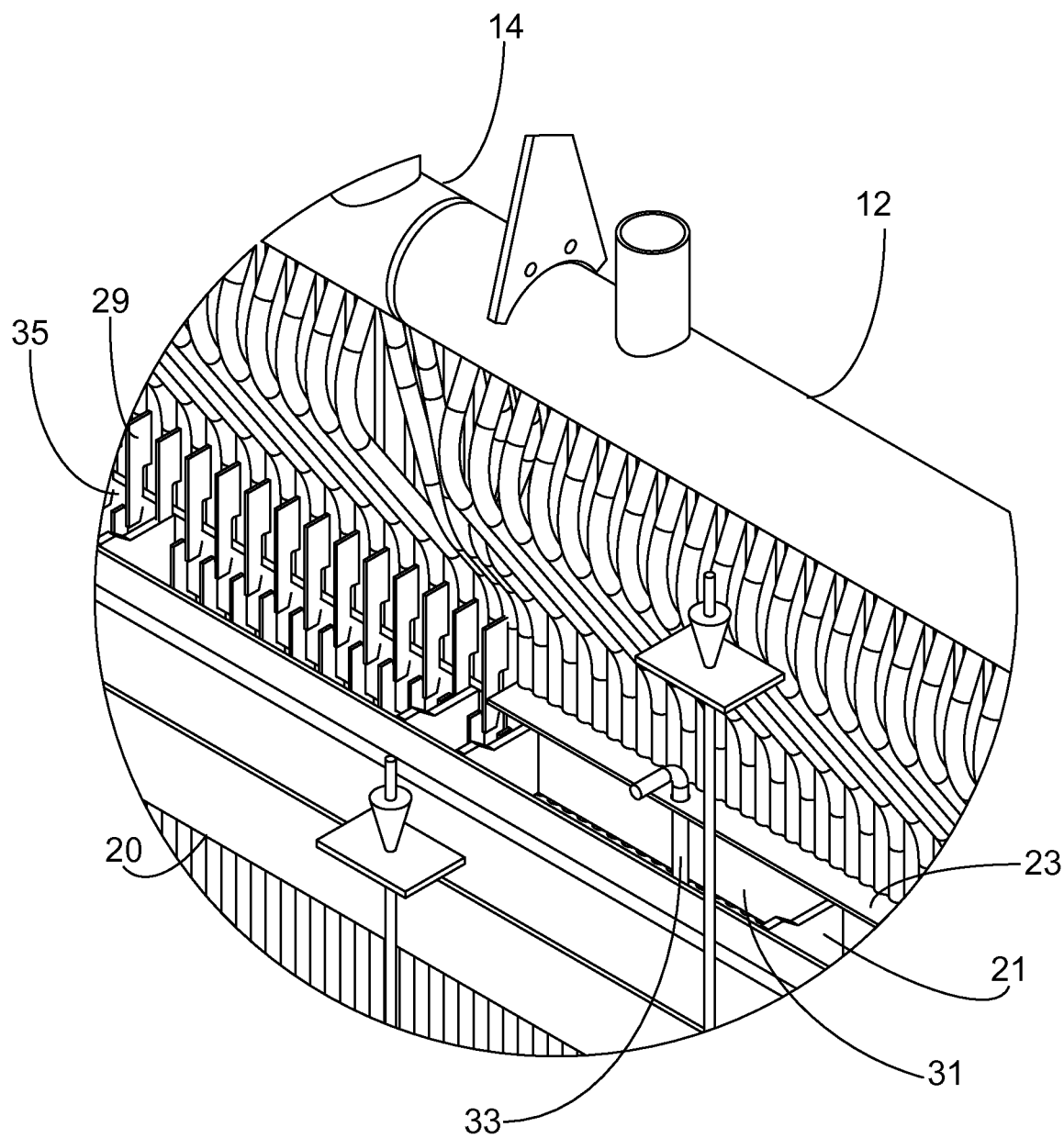
FIG. 12 is an illustration of one embodiment of a buckstay arrangement used to provide support for the evaporator and superheater panels by the vertical support structure according to the present invention.

There are three elevations of buckstays 20 to transmit wind, seismic, shipping, and thermal expansion, etc. loads from the panels 12, 14 into the support structure 18 as shown. The buckstay 20 beams are attached to the columns of the internal support structure 18 and are at staggered elevations to allow the buckstays to extend into the corners. The buckstays are also outside the panel insulation, and is thus referred to as a "cold" buckstay design. A tie bar 31 is held against the evaporator panels 12 with scallop bar 23 and pins 33 and, for the superheater panels 14, with tube clips 29 as shown in FIG. 12 and explained below. The clearances within the tie bar 31, buckstay 20, scallop bar 23, pins 33, and tube clip 29 system allow the panel to slide relative to the fixed tie bar 31 as the panel thermally expands vertically and in the tie bar axial direction; it allows for expansion in the tie bar 31 axial direction but does not allow expansion in a direction normal to a plane of the tube panel. Tie bar standoffs 21 are clipped to the buckstay 20 flange. This system allows for unrestrained thermal expansion of the tube panels in the vertical and tie bar 31 axial directions, thereby eliminating additional tube stresses.

To reduce cost and improve panel rigidity for shipment, the evaporator tubes 12 are attached with scallop bars 23, tie bar 31 and pins 33 at each buckstay elevation 20 as shown. Three sets of scallop bars 23 are implemented across the width of the panel 12 instead of tying all of the tubes together with one bar to reduce stress in the tube attachment weld, particularly between buckstay elevations 20 where the tubes are straight (no bends to reduce stress due to differential thermal expansion).

A more flexible tube attachment design is provided for the superheater panels 14; i.e., a separate buckstay system is provided for the evaporator 12 versus the superheater 14 panels. The superheater tubes are attached with a tube clip 29 and tie bar 35 arrangement as shown. This will allow each tube to expand independently since the potential for tube to tube temperature differentials is greater in the superheater 14 compared to the evaporator 12, particularly for adjacent tubes of different passes.

The panels were also designed to minimize the number of designs to reduce cost. With regard to tube bending geometry, there are only two designs or configurations, one for the evaporator 12 and one for the superheater 14 with the only difference being which side the tube attachments are on. This is illustrated in FIG. 2, where it will be seen that the upper and lower headers on one side of the solar receiver heat exchanger 10 are located outboard of the plane of the tangent tube wall panels, while the upper and lower headers on an adjacent side of the solar receiver heat exchanger 10 are located inboard of the plane of the tangent tube wall panels.

Figure 2:
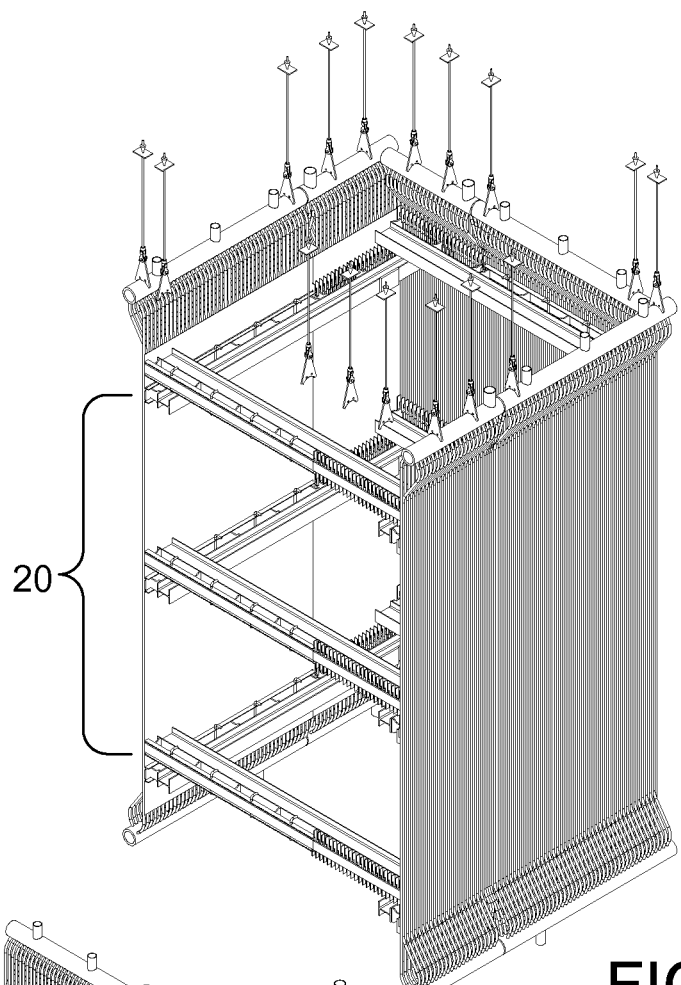
FIG. 2 is a further perspective view of the shop-assembled solar receiver heat exchanger illustrated in FIG. 1, with some of the components thereof omitted for clarity, illustrating the heat exchanger panels, the vertical support structure, and a buckstay arrangement used to provide support for such panels by the vertical support structure, according to the present invention.
Figure 2A:
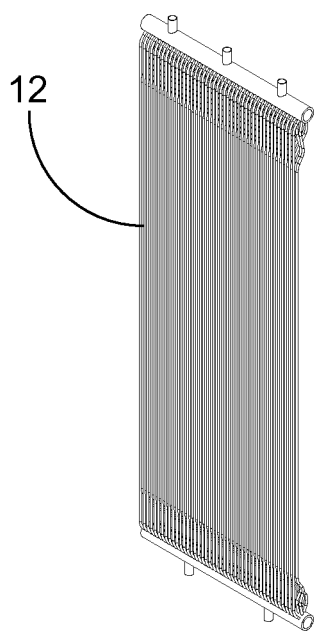
FIG. 2A is a perspective view of one of the evaporator panels illustrated in FIGS. 1 and 2, according to the present invention.
Figure 2B:
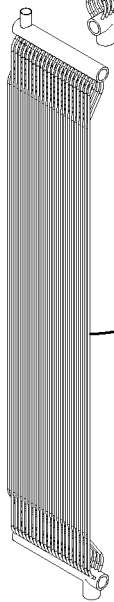
FIG. 2B is a perspective view of one of the multi-pass primary superheater panels illustrated in FIGS. 1 and 2, according to the present invention.
Figure 3:
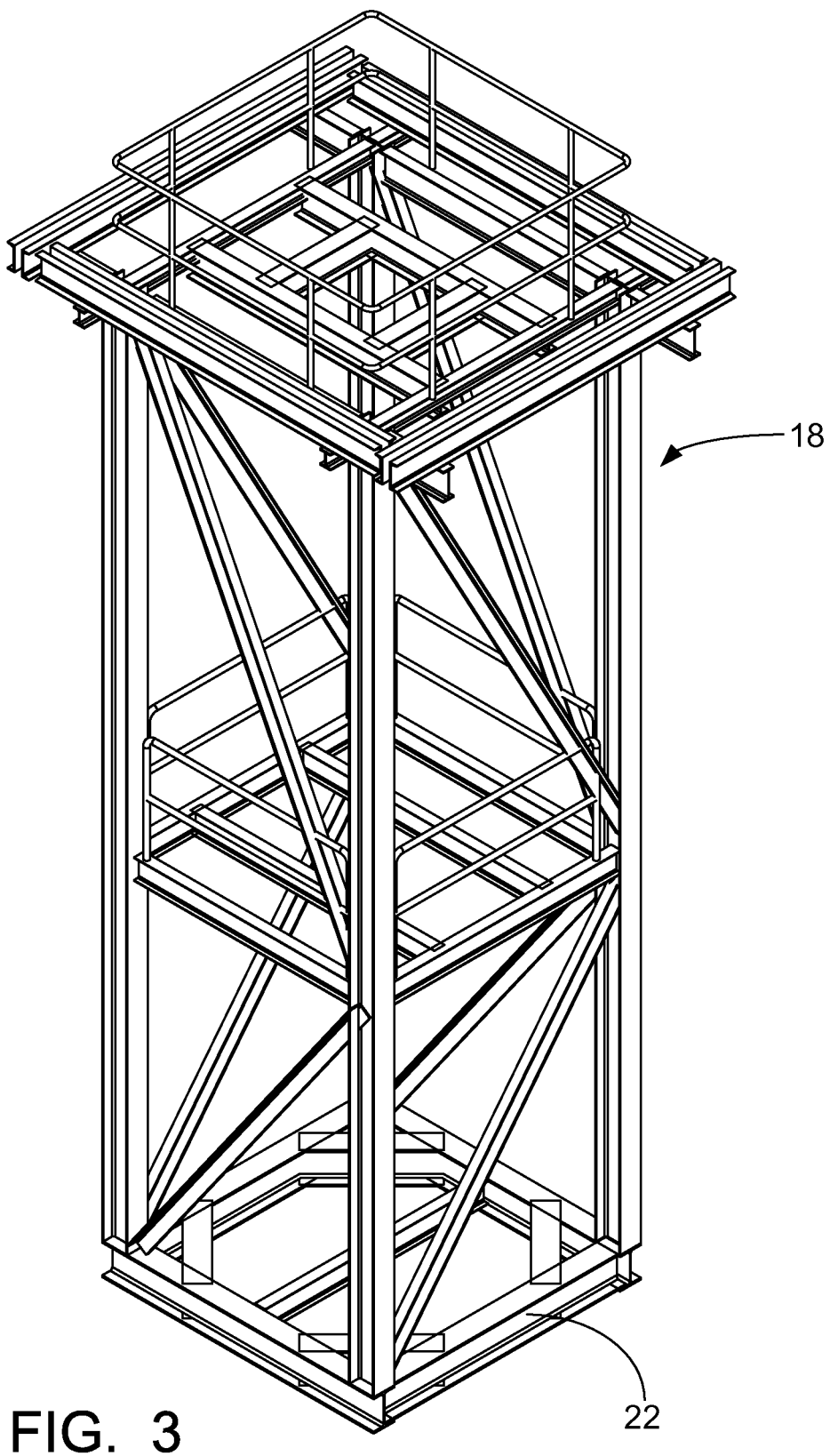
FIG. 3 is a perspective view of the vertical internal support structure of the shop-assembled solar receiver heat exchanger illustrated in FIG. 1, according to the present invention, wherein the vertical separator, steam risers and water supplies, steam piping, and heat shields have been omitted for clarity.
Figure 5:
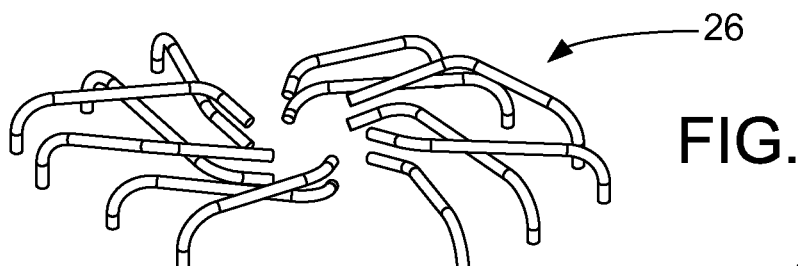
FIG. 5 is a perspective view of the steam risers which carry the water-steam mixture to the vertical separator, according to the present invention.
Figure 4:
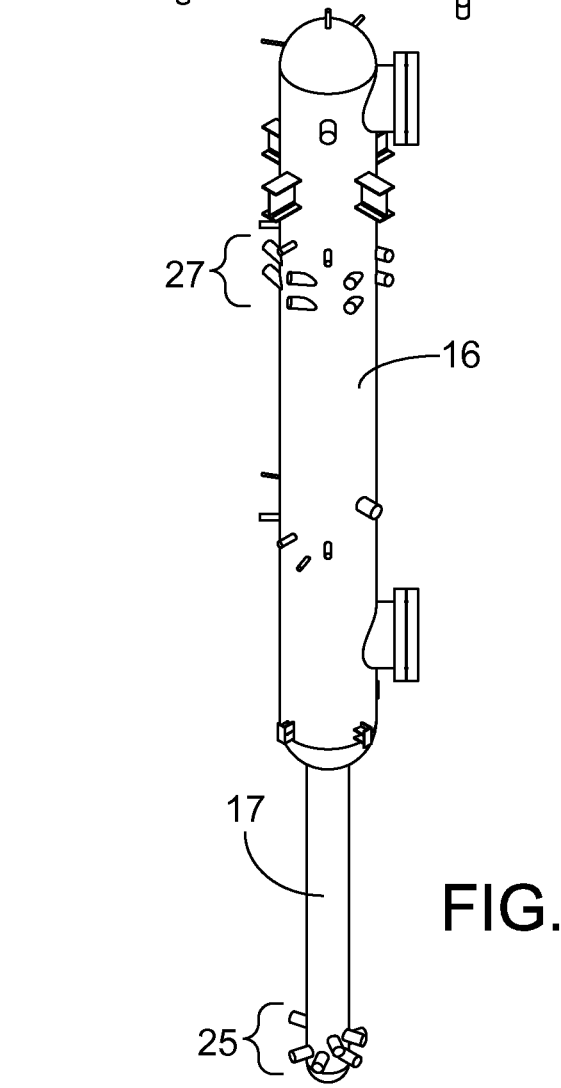
FIG. 4 is a perspective view of the vertical steam/water separator of the shop-assembled solar receiver heat exchanger illustrated in FIG. 1, according to the present invention.

The solar receiver heat exchanger 10 is top supported by the internal support structure shown in FIGS. 1, 2 and 3. The top steel of the vertical support structure 18 supports the panels 12, 14 and the vertical steam/water separator 16. The panels 12, 14 are supported by vertical rods attached to the back-to-back channel frame forming the perimeter of the top steel. This design allows for free downward thermal expansion of the panels and vertical separator. The support structure uses standard structural steel shapes and plate made of typical carbon steel material, such as A36 and A992, and is for the most part, bolted together. Other materials may be employed, depending upon temperature and other considerations. Structural tubing can be employed, but may have higher cost and require longer lead time. It also can complicate end connection design.

Referring to FIGS. 1 through 7, the supplies 24 deliver water from the vertical steam/water separator 16 downcomer pipe 17 to the bottom inlet headers of the evaporator panels 12. The risers 26 deliver the steam-water mixture from the upper headers of the evaporator panels 12 back to the vertical steam/water separator. The quantity and size of the supplies 24 and risers 26 are designed to satisfy natural circulation requirements. They are also designed with some flexibility to accommodate differential thermal expansion between the panel 12 headers and the vertical steam/water separator to minimize stress at the connections.

The saturated connections and saturated connection piping 28 deliver dry saturated steam from the top of the vertical steam/water separator to the PSH inlet headers located at the top of the panels 14. Due to the narrow inlet headers, only two saturated connecting pipes are required, one per header as shown. This piping is made of carbon steel and uses standard pipe sizes and schedule thicknesses. All piping is insulated and lagged to reduce heat loss.

Figure 6:
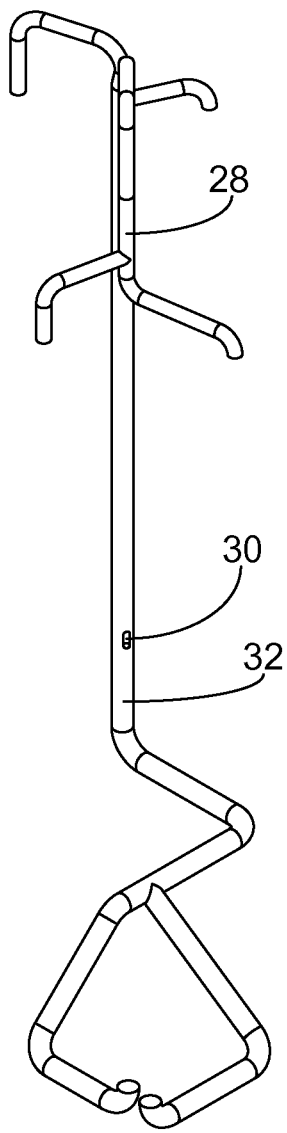
FIG. 6 is a perspective view of the saturated connections used to convey the steam to the superheater panels, and the attemperator and associated piping used for steam temperature control, according to the present invention.
Figure 7:
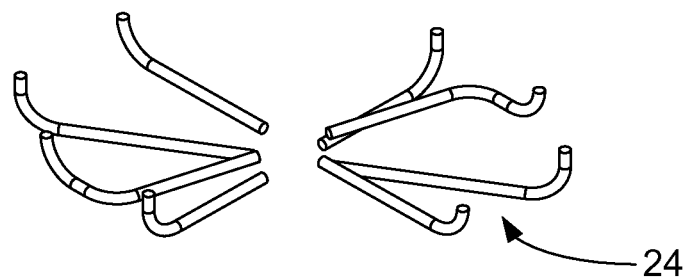
FIG. 7 is a perspective view of the supplies used to carry water to the evaporator panels, according to the present invention.
Figure 8:
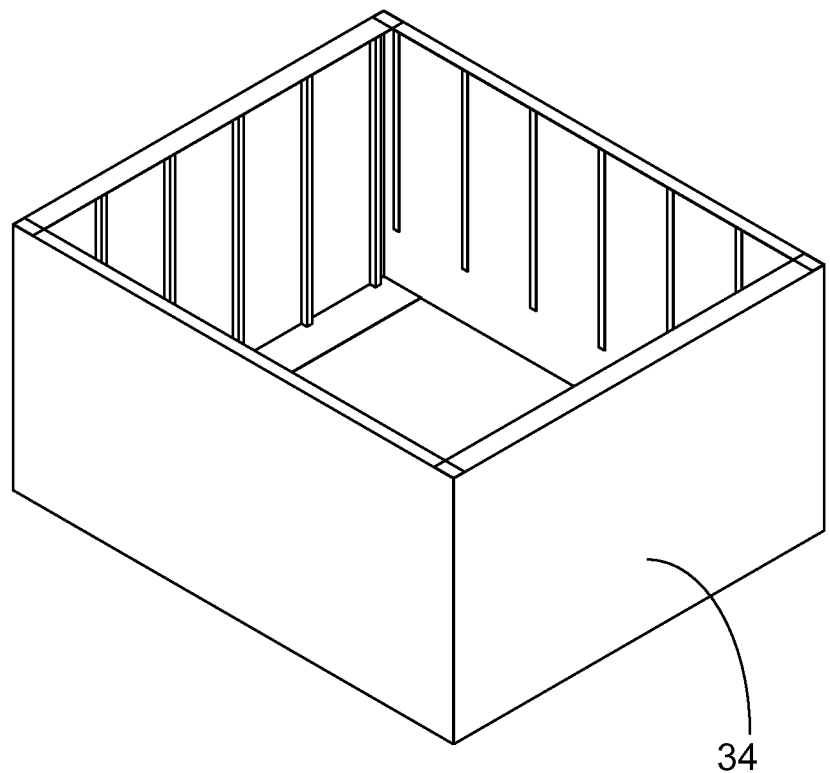
FIGS. 8 and 9 are perspective views of the heat shields used to protect the upper and lower headers and tubes of the evaporator and superheater panels, according to the present invention.
Figure 9:
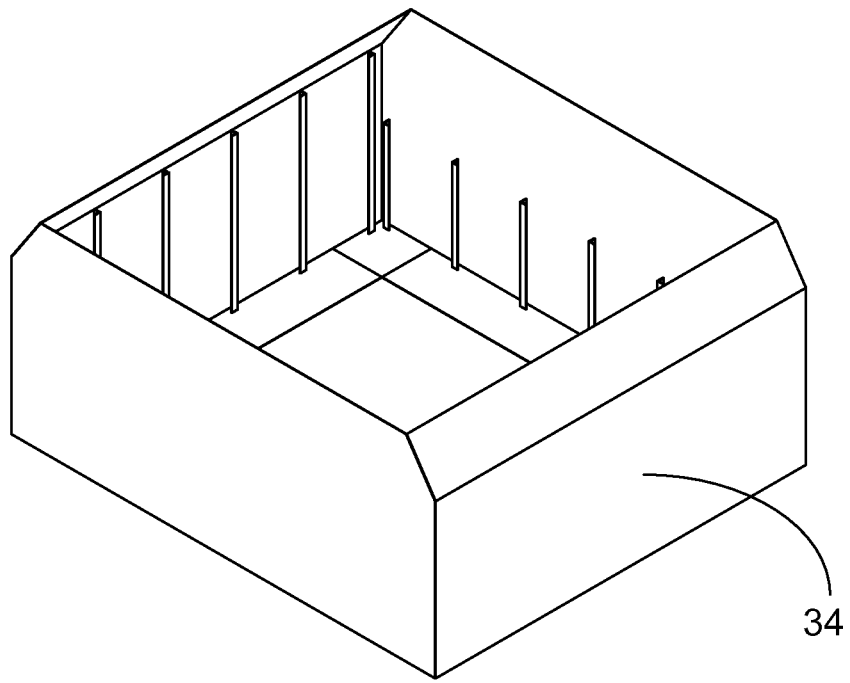
Figure 10:
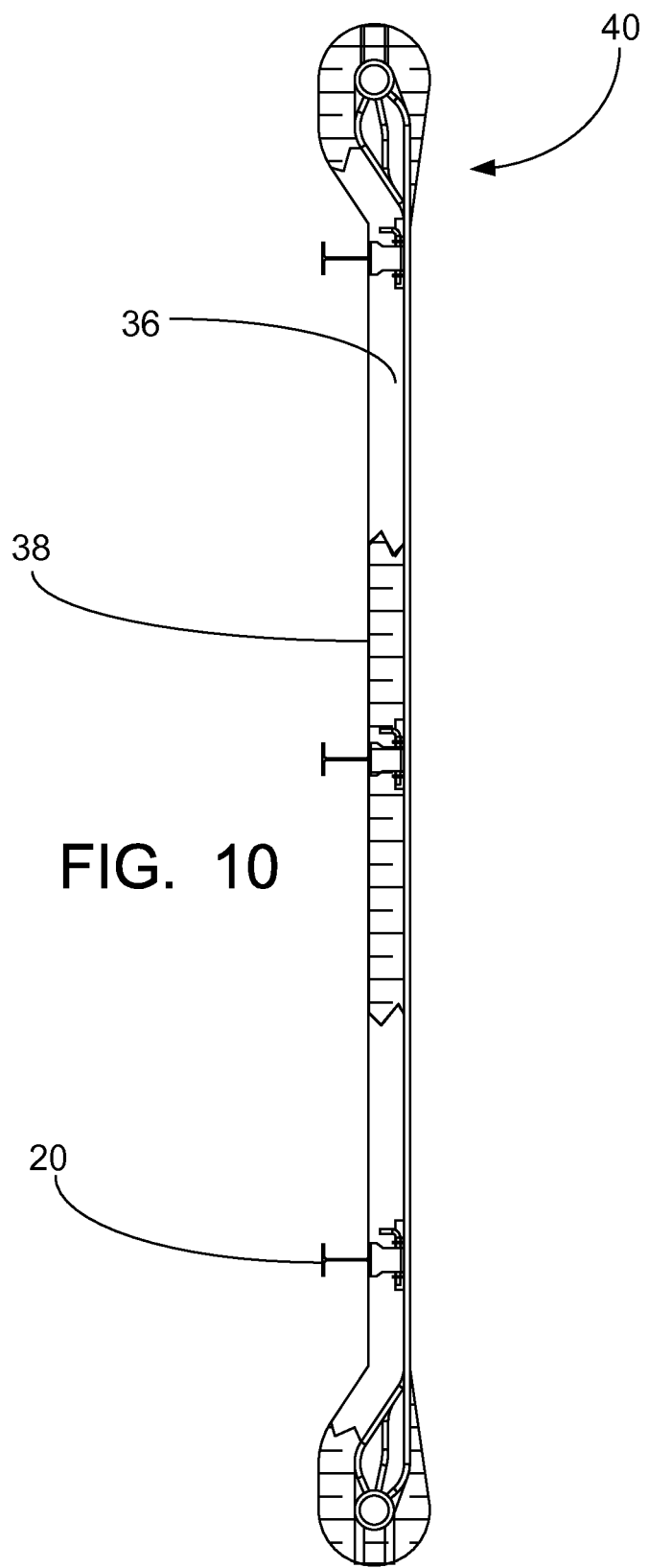
FIG. 10 is an illustration of a typical evaporative surface or superheat surface panel with a light barrier and insulation.

The shop-assembled solar receiver heat exchanger 10 has one stage of spray attemperation and piping 32 for steam temperature control, located between the PSH and SSH, as shown in FIGS. 1 and 6. A single stage reduces cost and simplifies piping. The attemperator and piping 32 are located inside the receiver enclosure as shown. The attemperator uses feedwater for attemperation. The attemperator and piping will be supported by the receiver support structure 18 and/or by the panel headers. These components are also insulated and lagged to reduce heat loss.

The upper and lower headers and tube bends for the panels must be protected from light spillage and stray light energy. This is accomplished with heat shields 34 that extend around the perimeter of the solar receiver 10, and as shown on FIGS. 1, 8 and 9. One end or edge of the heat shields 34 are bolted or welded to the support structure 18 and the other end is free. The heat shields 34 are made of thin gage steel with stiffeners on the back side and along the free edge to resist wind and seismic loads. The heat shields 34 may also be joined at the corners to provide additional stiffness to avoid attachment to the tubes. Provisions for thermal expansion to reduce or prevent buckling are required. The heat shields 34 are painted white on the exposed side and are not insulated on the back side to reduce operating temperature. A gap is provided between the heat shields 34 and tube panels 12, 14 to allow natural circulation of air for additional cooling. To reduce shipping dimensions, the shields are field installed.

A panel barrier 36 is required on the back of the panels 12, 14 to protect the insulation and structure from rain and heat exposure that may get through gaps between the loose tangent tubes. See FIG. 10, which illustrates the panel barrier 36 system. The panel barrier 36 comprises an array of metal sheets supported by the tube attachment structure. One end will be fixed and the other guided to allow thermal expansion. For the evaporator 12, the panel barrier will be supported from the scallop bars and for the superheater 14, by the tie plate. The panel barrier 36 will be painted white on the tube side to maximize reflectance and reduce operating temperatures. The panel barrier 36 will also support the panel insulation and lagging.

Instrumentation 40 to measure tube hot face temperatures, fluid temperatures and heat flux on the panels would likely be provided. Additional instrumentation such as strain gages and trams to measure deflections and thermal expansion of various components may also be provided. SH steam temperatures will be measured via pad welded thermocouples located on the cold (insulated) side of the tube outlet legs near the headers.

Figure 13:
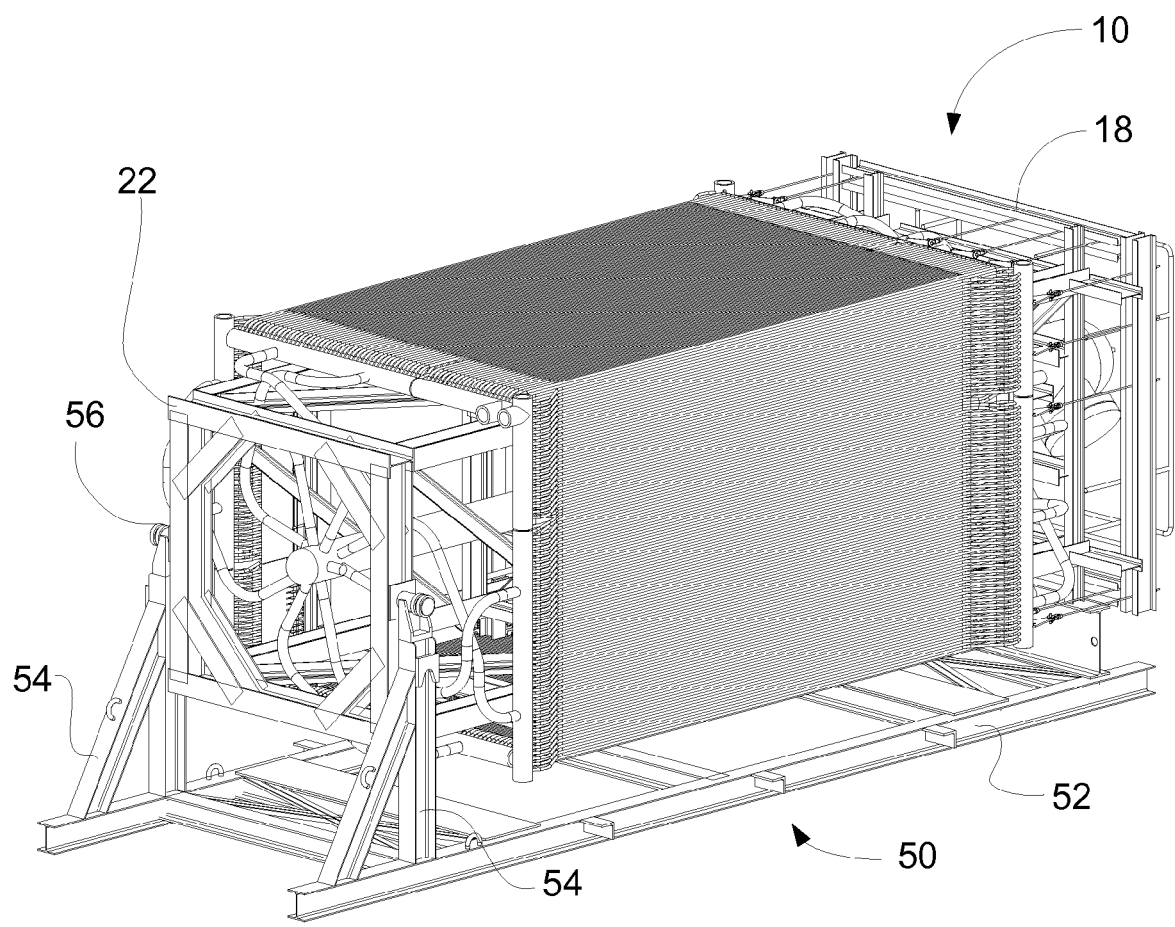
FIGS. 13 and 14 illustrate two perspective views of a fabrication/transport/lifting fixture according to the present invention which facilitates fabrication, assembly, transportation and erection of the shop-assembled solar receiver heat exchanger from the shop to the field, FIG. 13 illustrating the shop-assembled solar receiver heat exchanger in assembly and shipping position for transport, FIG. 14 illustrating the shop-assembled solar receiver heat exchanger in partial erection uprighting position during the erection process.
Figure 14:
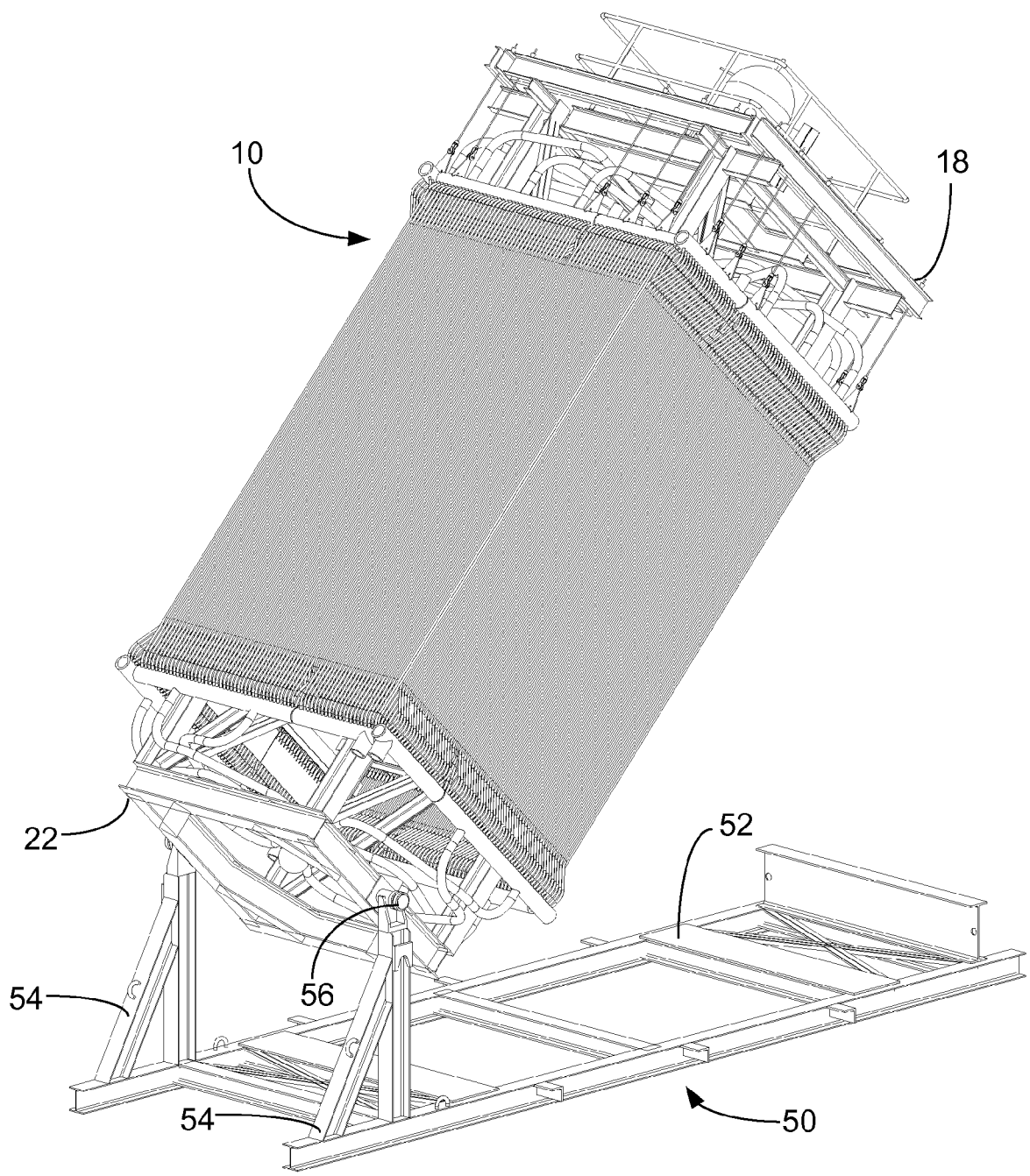

As shown in FIGS. 13 and 14, another aspect of the present invention is drawn to a shipping rig or fabrication/transport/lifting fixture 50 which facilitates fabrication, assembly, transportation and erection of the heat exchanger from the shop to the field. The fixture comprises a base 52, and two stanchions 54 provided at one end thereof. The stanchions 54 support two trunnion shafts 56 attached to the vertical support structure 18 of the solar receiver. The trunnion shafts 56 engage the stanchions 54 on the fixture during shipment of the shop-assembled solar receiver heat exchanger 10 to support same and for permitting rotation of the shop-assembled solar receiver heat exchanger 10 on the stanchions 54 from a shipping position to a substantially vertical position during a portion of the field erection process of the shop-assembled solar receiver heat exchanger. Lifting lugs are located on the top end of the support structure 18. Upon arrival at the job site in the field, a crane lifts the solar receiver heat exchanger 10 to vertical, rotating on the trunnion shafts 56, and then lifts the solar receiver heat exchanger 10 for placement at a desired location, such as on the top of the receiver tower (not shown).

FIGS. 15 through 17 illustrate top, end and cut-away views, respectively, of a split diaphragm plate 58 used in the superheater 14 inlet and outlet headers to provide multiple steam paths in the superheat panels 14 when tangent tubes are employed. A traditional circular diaphragm is welded into the inside of a header to compartmentalize it into separate fluidic compartments along the length of the header. As long as the tube stub connections are spaced far enough apart along the length of the header, this approach will work. However, in the present application with closely spaced tangent tubes forming the superheat panels 14, the tube stub connections on the inlet and outlet headers are staggered and close together. A conventional circular diaphragm would interfere with some of the tube stubs attached to the headers. In order to overcome this problem, the diaphragm plate is a split diaphragm plate 58 comprised of two semi-circular diaphragm plates A and B, as shown, which are inserted into the header and welded to one another along a diameter and at the circumference of each plate A and B to the inside surface of the header.

Referring to FIGS. 18 through 22 there is shown an alternate embodiment of a tangent tube support system according to the present invention. A typical tangent tube support system comprising a buckstay, standoffs, tie bar, and tube clips (when considering superheat panels 14 of the type used in the present shop-assembled solar receiver heat exchanger 10) does not provide adequate support or positively enforce a "light tight" construction in the header axial direction. Since the receiver 10 is shop-assembled, and will be transported horizontally and then erected into a vertical position, it is important to provide for adequate support of the tangent tube panels 12 and 14 during and in between both conditions. More specifically, it is necessary to provide for a non-typical level of support which addresses concerns due to shipping the receiver 10 and locating the receiver 10 in a high seismic zone, accommodates for all anticipated thermal expansions, enforces the appropriate tube spacing to insure a "light tight" construction, supports manufacturability, and supports field replacement should that become necessary. The tangent tube support system must provide for adequate support of the primary and secondary superheat tube panels 14, and the evaporator tube panels 12.

Figure 20:
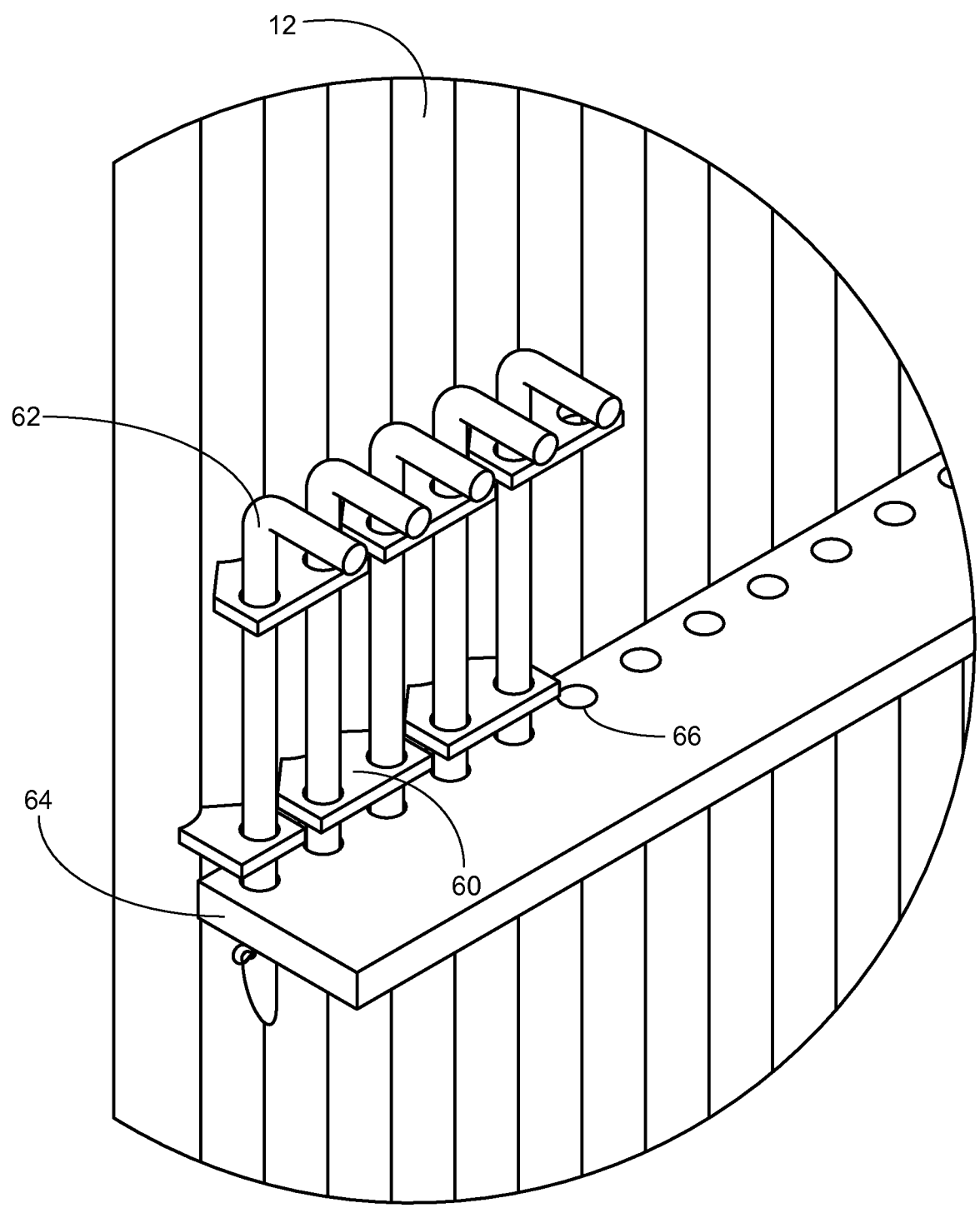

To address these issues, in this embodiment partially circumferentially welded tube lugs 60 are employed on each tube of a panel 12 or 14, and wherein each lug 60 is located on adjacent tubes at offset elevations with clearances to accommodate for both manufacturing considerations and expected tube-to-tube temperature differentials (a significant concern when considering superheat 14 tube panels). As shown in FIG. 20, the tube lugs 60 are each provided with two apertures which accept pins 62 to provide a two-pinned connection to a collector beam assembly comprised of upper and lower collector beams 64 which are each provided with corresponding apertures 66 for accepting the pins 62, and interconnecting plates 68. This embodiment thus supports a panel comprised of n tubes by implementing (n+1) intermediately located pins 62, where n is an integer representing the number of tubes in a panel. Therefore while in many ways advantageous to a single pin support location (per lug) design, this effect is still similarly accomplished by implementing a single lug per tube and approximately a single pin per tube (when considering overall quantities required for manufacturing). The clearances between the tube lugs 60 and collector beam assembly again accommodate for both manufacturing considerations and expected tube-to-tube temperature differentials.

Figure 19:
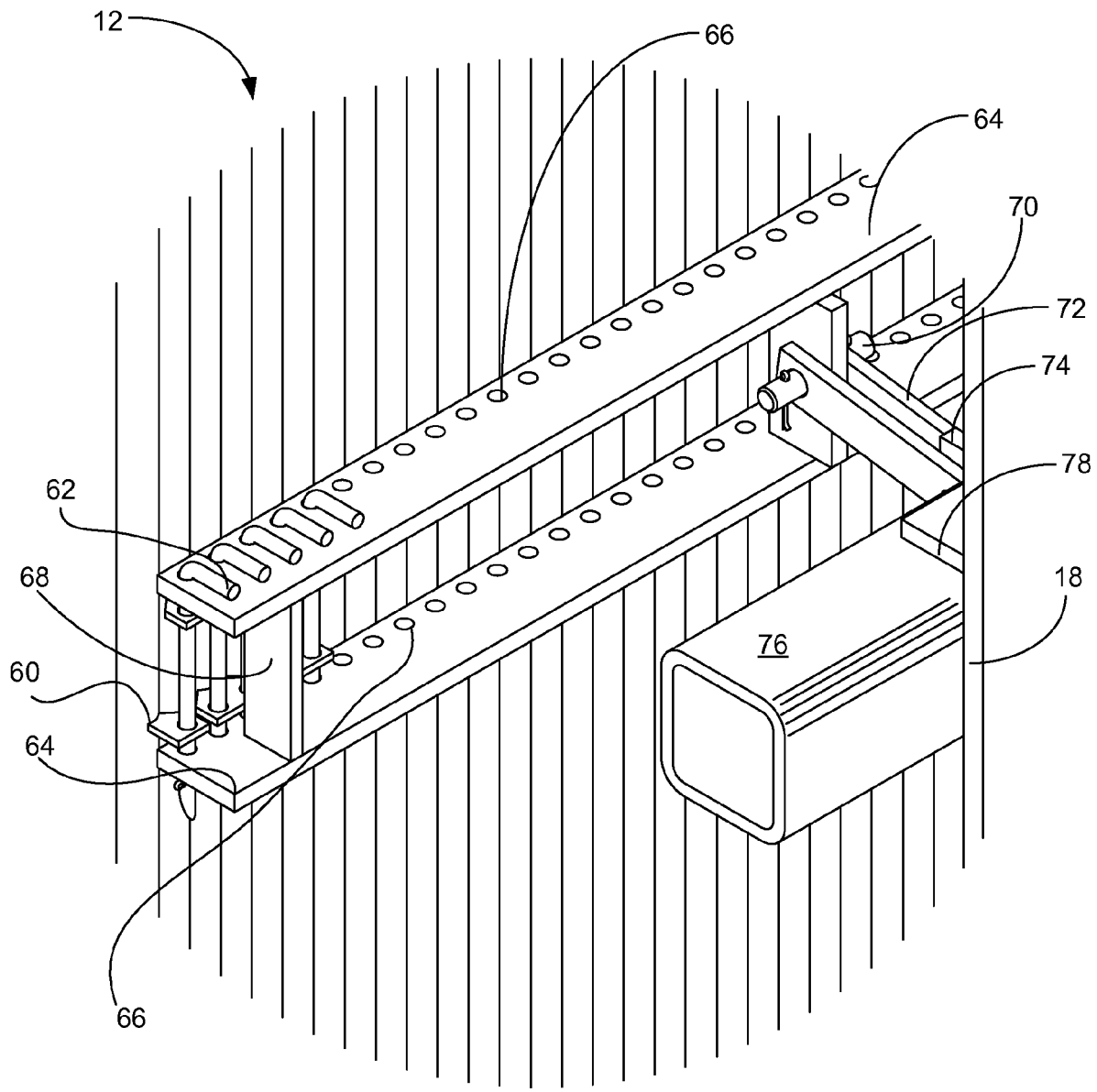
FIGS. 19 and 20 are close-up views of portions of FIG. 18, and wherein portions of the tangent tube support system of FIG. 18 have been omitted from FIG. 20 for clarity.
Figure 21:
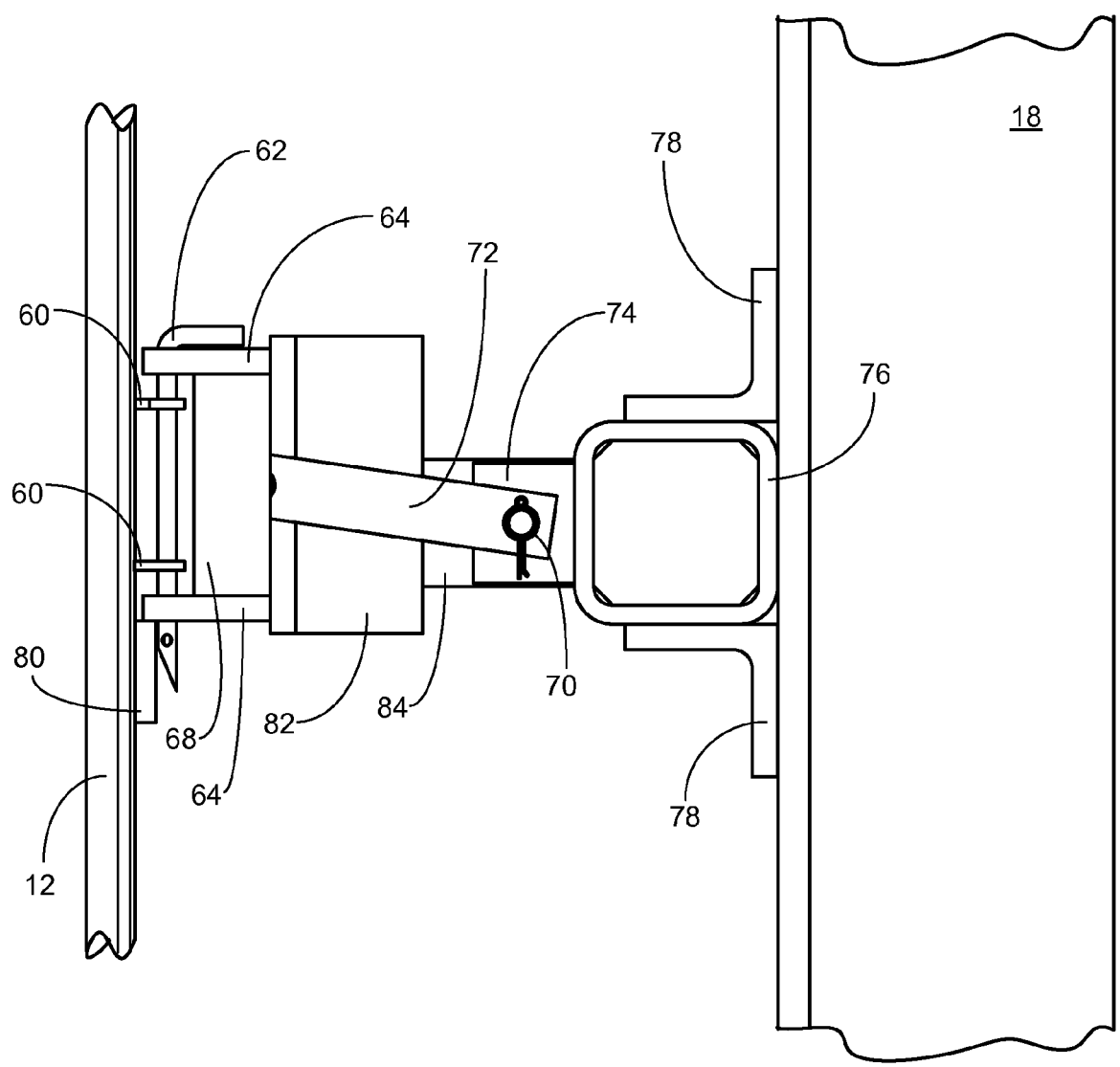
FIG. 21 is a side view of the tangent tube support system of FIG. 19 viewed along a plane of the heat exchanger wall.
Figure 22:
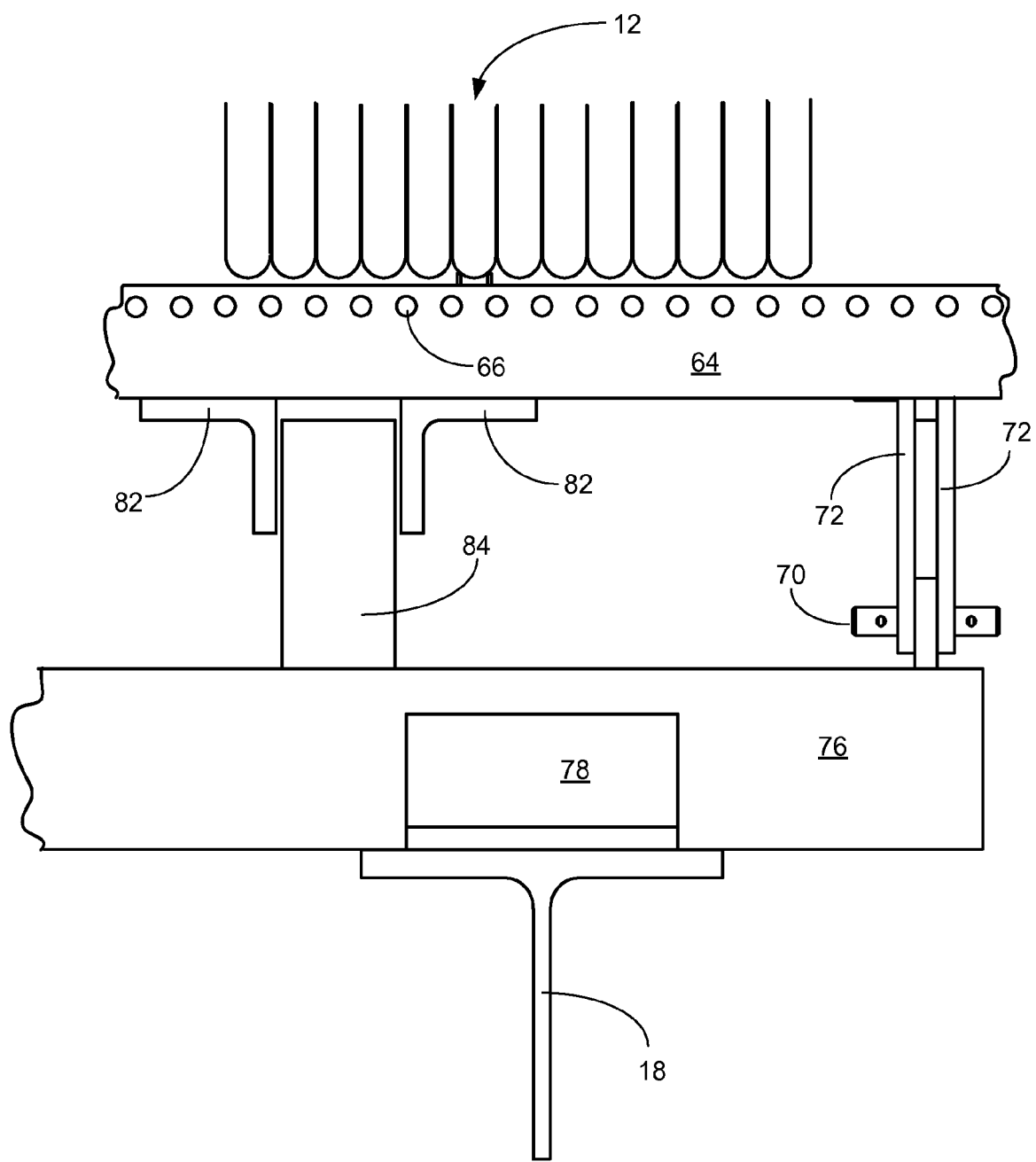
FIG. 22 is a plan view of FIG. 21.

Two interconnecting plates 68 per supported tube panel are connected via pins 70 and rotating link bars 72 to a link bar support lug 74 attached to a flexural support member 76, via structural steel 78 to the columns comprising the vertical support structure 18 (FIGS. 19, 21 and 22). Through the aforementioned system, forces acting on each tube in a direction perpendicular to the plane defined by the tube panel can be efficiently supported by structural steel. Additionally the rotating link bars 72 purposefully allow for rotation and thus accommodate for the average thermal expansion of the supported tube panels as a whole; the rotating link bars 72 in this embodiment will typically be ½ preset for this thermal expansion. Two collector beam assembly support lugs 80 are located per supported tube panel in the appropriate locations so that the collector beam assembly travels at the panel's average thermal expansion while also providing a load path for vertical dead load of the assembly, light barrier, insulation, and lagging to be efficiently supported by the structural steel.

Figure 18:
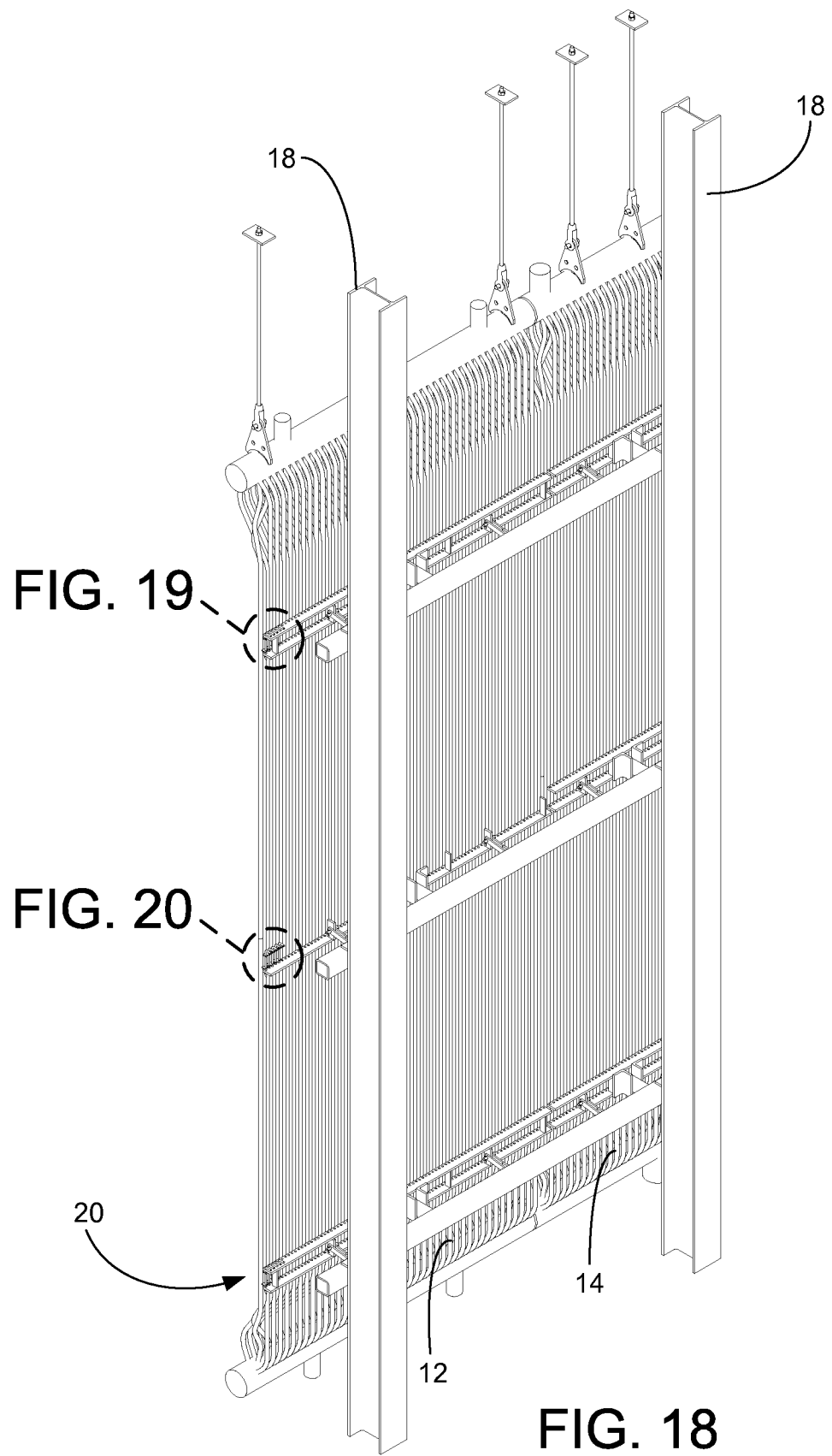
FIG. 18 is a perspective view of an alternative embodiment of a buckstay arrangement tangent tube support system according to the present invention.

As best illustrated in FIGS. 18 and 22, bumper guides 82 are affixed to the center (considering the header axial direction) of the collector beam assembly and a cantilevered bumper 84 is attached to the flexural support member 76, which again is attached via structural steel 78 to the columns of the vertical support structure 18. Through the aforementioned system, forces acting on each tube in the header axial direction can be efficiently supported by the structural steel while allowing for the appropriate tube panel thermal expansions. Additionally the bumper system provides a centrally located anchor point for thermal expansion in the header axial direction. While the primary function of this embodiment is to adequately support the tangent tube panels for all expected loading conditions while still allowing for the appropriate thermal expansions, there are a number of other advantages realized through the use of this approach:

1. The collector beam assembly offers a convenient shelf on which to locate a light barrier, insulation, and lagging.
2. The collector beam assembly reduces costs and facilitates shop manufacture. Manufacturing and assembling the tube lugs 60, pins 62, collector beams 64, and interconnecting plates 68 yields a convenient fixture that assists in the manufacturing process. The fixture is temporarily affixed to a tube panel assembly at the appropriate elevation and the individual tube lugs 60 are tack welded in place. Upon removal of the fixture the tube lug 60 welding process is finalized providing a fitted tube panel to collector beam assembly.

The pin 70 and link bar 72 system supports field replacement. The tube panels can be completely detached from the vertical support structure (when considering a single tube panel) by removing the relevant header/piping connections, disconnecting two header vertical support rods, and disconnecting the two pins 70 more proximal to the support structure at each tangent tube support elevation. As they presumably reside outside of the light barrier, insulation, and lagging the proposed invention offers a convenient method to remove tube panels for field replacement.

The element of this embodiment that remains regardless of the aforementioned design is the partially circumferentially welded tube lug 60 design located on offset elevations that each provides two pinned 62 support locations allowing (n+1) intermediately located pins to support a n tangent tube panel.

The collector beam assembly could be comprised of different structural shapes, if desired. For example, instead of the pair of long rectangular bars forming each of the collector beams 64, which may flex or bow with gravity, the collector beams 64 could be comprised of 90 degree angles which are stiffer. The apertures 66 provided through one of the legs of each angle are then more likely to be aligned with the apertures in the lugs 60, facilitating installation of the pins 62. The other legs of the angles would be oriented towards the vertical support 18. Alternatively, a single structural T shape, where the stem of the T is located between the offset tube lugs 60 and the apertures 66 for receiving the pins 62 are provided therein, and the bar of the T is oriented towards the vertical support 18, may be employed.

The cantilevered hollow structural shape (HSS) bumper 84 and HSS flexural support member 76, as illustrated in the FIGURES, could be similarly accomplished utilizing W or other structural shapes. This would allow more typical attachments to structural steel and should more readily allow the tangent tube support system's flexural support member 76 to serve additional purposes in the structural steel. The various components can be fabricated from carbon steel, or other materials such as stainless steel or other alloy steels.

It will also be appreciated that while the tangent tube support system described above has particular applicability to a solar receiver heat exchanger, it is not limited to that setting and this system can be employed in any heat exchanger where differential and average thermal expansion of loose tangent tube panels must be accommodated for while providing adequate support for all anticipated loading conditions.

It will thus be appreciated that the present invention provides a thermally and cost-effective solar receiver heat exchanger design having the following properties. The design is low cost, and capable of being shop-assembled in a mass-production environment. Its size permits truck shipment within normal limits for truck shipment (truck width <13 ft, overall height <12'6", overall length <35 ft.). The relatively low weight reduces shipping and erection costs. The solar receiver heat exchanger is designed for high reliability and long life while operating under highly cyclic operating conditions, and is capable of withstanding daily startups, shutdowns and cloud transients without suffering low cycle fatigue damage. The vertical steam/water separator is capable of fast startups and load raising following cloud passes to maximize available heat usage and full load operation. The natural steam/water circulation design is fully drainable and eliminates the need for a costly circulating pump, while meeting required steam capacity and performance.

Although the present invention has been described above with reference to particular means, materials, and embodiments, it is to be understood that this invention may be varied in many ways without departing from the spirit and scope thereof. For example, the solar receiver heat exchanger may be scaled to a larger size, depending upon the amount of steam flow desired; however, particular shipping or transport limitations may have to be considered in order to take advantage of shop assembly to the maximum extent. Therefore, the present invention is not limited to these disclosed particulars but extends instead to all equivalents within the scope of the following claims.

We claim:

1. A shop-assembled solar receiver heat exchanger comprising:
    a multi-sided arrangement of heat transfer surfaces, a vertical steam/water separator structurally and fluidically interconnected thereto; and
    a vertical support structure top supporting the vertical steam/water separator and the heat transfer surfaces,
    wherein each side of the multi-sided arrangement of heat transfer surfaces has both an evaporative heat transfer surface section and a superheater heat transfer surface section, such that both the evaporative heat transfer surface section and the superheater heat transfer surface section of each side of the multi-sided arrangement are each individually formed from a loose tangent tube panel having a plurality of individual tangent tubes, an upper header and a lower header, such that the tangent tubes of each loose tangent tube panel are operatively coupled to two or more collector beams along an inner surface thereof, wherein the two or more collector beams are located between the upper and lower headers of the loose tangent tube panels.

2. The shop-assembled solar receiver heat exchanger according to claim 1, wherein the vertical support structure is interposed between the vertical steam/water separator and the arrangement of heat transfer surfaces.

3. The shop-assembled solar receiver heat exchanger according to claim 1, wherein cold buckstays are provided on the vertical support structure to provide lateral support for the loose tangent tube panel while allowing for unrestrained thermal expansion of the tube panel in both the horizontal and vertical directions, thereby eliminating additional tube stresses.

4. The shop-assembled solar receiver heat exchanger according to claim 1, comprising heat shields provided to shield the upper and lower ends of the loose tangent tube panel and the associated headers.

5. The shop-assembled solar receiver heat exchanger according to claim 1, wherein each side of the solar receiver heat exchanger comprises at least one evaporator tube panel and at least one superheater tube panel.

6. The shop-assembled solar receiver heat exchanger according to claim 5 wherein superheater tube panels on at least two sides of the solar receiver heat exchanger meet to form a first corner.

7. The shop-assembled solar receiver heat exchanger according to claim 6, wherein superheater tube panels forming a second corner opposite said first corner comprise secondary superheater panels.

8. The shop-assembled solar receiver heat exchanger according to claim 1, comprising plural panels of evaporative heat transfer surface sections all of a first configuration and plural panels of superheater heat transfer surface sections all of a second configuration.

9. The shop-assembled solar receiver heat exchanger according to claim 1, wherein the vertical steam/water separator comprises tangentially arranged, downwardly sloped inlet nozzle riser connections to impart a downward spin on incoming steam/water mixtures to initiate moisture removal, and internal perforated plate, scrubber and dry pan for final moisture removal.

10. The shop-assembled solar receiver heat exchanger according to claim 3, comprising scallop bars and pins and tube clips interconnecting the tube panel and the cold buckstays to reduce stresses caused by differential thermal expansion.

11. The shop-assembled solar receiver heat exchanger according to claim 5, wherein the at least one superheat panel comprises an upper and a lower header, each header having two rows of tube stub connections which are staggered, and each header also having a split diaphragm plate comprised of two semi-circular diaphragm plates which are welded to one another along a diameter and at the circumference of each plate to an inner surface of the header, to provide a multiple pass superheat panel.

12. The shop-assembled solar receiver heat exchanger according to claim 1, wherein the tube panel comprises insulation and lagging provided behind the tube panel and light barriers interposed between the back of the panel and the insulation and lagging to protect the insulation, lagging and support structure from rain and light exposure that may pass through gaps between the loose tangent tubes forming the tube panel.

13. The shop-assembled solar receiver heat exchanger according to claim 1, wherein the heat exchanger is designed for natural circulation and does not require a circulating pump.

14. The shop-assembled solar receiver heat exchanger according to claim 1, wherein the heat exchanger is provided with at least one circulating pump to provide for assisted circulation or pumped circulation.

15. The shop-assembled solar receiver heat exchanger according to claim 1, comprising trunnion shafts attached to the vertical support structure, the trunnion shafts for engaging stanchions on a fixture during shipment of the shop-assembled solar receiver heat exchanger to support same and for permitting rotation of the shop-assembled solar receiver heat exchanger on the stanchions from a shipping position to a substantially vertical position during a portion of the field erection process of the shop-assembled solar receiver heat exchanger.

16. The shop-assembled solar receiver heat exchanger according to claim 1, wherein the arrangement of heat transfer surfaces comprise evaporative surfaces and wherein the vertical steam/water separator is provided with riser nozzle connections located to prevent backward flow of water from the evaporative surfaces into the vertical steam water separator during a shut down.

17. The shop-assembled solar receiver heat exchanger according to claim 1, wherein the loose tangent tube panel is supported from the vertical support structure so as to accommodate tube-to-tube temperature differentials as well as average thermal expansion of the tube panel.

18. The shop-assembled solar receiver heat exchanger according to claim 17, wherein tube-to-tube temperature differentials are accommodated by providing a partially circumferentially welded tube lug on each tube, each lug having two apertures, the lugs on adjacent tubes being located on offset elevations, and a pin passing through one aperture of the lug on a given tube and through one aperture of the lug on an adjacent tube such that each tube has a two-pinned connection with a collector bar assembly allowing (n+1) intermediately located pins to support the loose tangent tube panel having n tubes from the vertical support structure.

19. The shop-assembled solar receiver heat exchanger according to claim 18, wherein the average thermal expansion of the loose tangent tube panel is accommodated by rotating link bars attached to the collector beam assembly and to the vertical support structure.

20. The shop-assembled solar receiver heat exchanger according to claim 18, comprising bumper guides affixed to a center of the collector beam assembly and a cantilevered bumper attached to the vertical support structure which provides a centrally located anchor point for thermal expansion and permits forces acting on each tube in a header axial direction to be efficiently supported by the vertical support structure while allowing for tube panel thermal expansion.

21. In combination with a heat exchanger comprised of panels of loose tangent tubes connected to headers and supported from a vertical support structure, a support system for accommodating tube-to-tube temperature differentials as well as average thermal expansion of the tube panels as a whole, comprising:
  a partially circumferentially welded tube lug on each tube, each lug having two apertures, the lugs on adjacent tubes being located on offset elevations; and
  pins, each pin passing through one aperture of the lug on a given tube and through one aperture of the lug on an adjacent tube, and two different pins passing through the apertures of the lug on a given tube, such that each tube has a two-pinned connection with a collector beam assembly allowing (n+1) intermediately located pins to support a loose tangent tube panel having n tubes from the vertical support structure, and rotating link bars attached to the collector beam assembly and to the vertical support structure.

22. The support system according to claim 21, comprising bumper guides affixed to a center of the collector beam assembly and a cantilevered bumper attached to the vertical support structure which provides a centrally located anchor point for thermal expansion and permits forces acting on each tube in a header axial direction to be efficiently supported by the vertical support structure while allowing for tube panel thermal expansion.

23. The support system according to claim 21, wherein the collector beam assembly comprises an upper collector beam and a lower collector beam joined together by interconnecting plates, the upper collector beam and the lower collector beam containing apertures, each pin also passing through an aperture on the upper collector beam and an aperture on the lower collector beam.

* * * * *